(12) United States Patent
Hanson

(10) Patent No.: US 11,356,190 B2
(45) Date of Patent: Jun. 7, 2022

(54) CONFIGURABLE WIDE AREA DISTRIBUTED ANTENNA SYSTEM

(71) Applicant: CommScope Technologies LLC, Hickory, NC (US)

(72) Inventor: Van Erick Hanson, Forest, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/383,264

(22) Filed: Apr. 12, 2019

(65) Prior Publication Data

US 2019/0319736 A1 Oct. 17, 2019

Related U.S. Application Data

(60) Provisional application No. 62/657,604, filed on Apr. 13, 2018.

(51) Int. Cl.
*H04B 10/2575* (2013.01)
*H04J 14/02* (2006.01)
(Continued)

(52) U.S. Cl.
CPC ............ *H04J 14/0227* (2013.01); *H04B 7/02* (2013.01); *H04B 10/2575* (2013.01);
(Continued)

(58) Field of Classification Search
CPC ..... H04B 10/22–2504; H04B 10/2575–25759; H04B 10/27–278; H04J 14/02–0286
(Continued)

(56) References Cited

U.S. PATENT DOCUMENTS 4,736,462 A * 4/1988 Joel, Jr. .............. H04Q 11/0005
398/154
5,475,679 A * 12/1995 Munter ............... H04L 12/5601
370/395.4
(Continued)

FOREIGN PATENT DOCUMENTS

WO 2011071870 A1 6/2011
WO 2015165488 A1 11/2015

OTHER PUBLICATIONS

International Searching Authority, "International Search Report and Written Opinion from PCT Application No. PCT/US2019/027325 dated Aug. 1, 2019", from Foreign Counterpart to U.S. Appl. No. 16/383,264, pp. 1-14, Published: WO.
(Continued)

*Primary Examiner* — Li Liu
(74) *Attorney, Agent, or Firm* — Fogg & Powers LLC

(57) ABSTRACT

A configurable wide area distributed antenna system is provided. At least one remote master unit of the system is in communication with at least one base station. The remote master unit includes a remote switch function that provides at least multiplexing in a downlink direction, demultiplexing in an uplink direction and routing of digital samples. The local master unit is located remote from the remote master unit. The local master unit is in communication with at least one remote antenna unit used to provide communication coverage in a select coverage area. The local master unit includes a local switch function providing at least demultiplexing in a downlink direction, multiplexing in an uplink direction and routing of digital samples. At least one communication link communicatively couples the remote master unit to the local communication unit with transport media interfaces.

23 Claims, 14 Drawing Sheets

(51) Int. Cl.
*H04Q 11/00* (2006.01)
*H04L 7/00* (2006.01)
*H04B 7/02* (2018.01)
*H04B 10/27* (2013.01)

(52) U.S. Cl.
CPC ....... *H04B 10/25753* (2013.01); *H04B 10/27* (2013.01); *H04J 14/0212* (2013.01); *H04J 14/0267* (2013.01); *H04L 7/0075* (2013.01); *H04Q 11/0005* (2013.01); *H04Q 2011/0047* (2013.01); *H04Q 2011/0054* (2013.01)

(58) Field of Classification Search
USPC ...................................... 398/43–79, 115–117
See application file for complete search history.

(56) References Cited

U.S. PATENT DOCUMENTS

| | | | | |
|---|---|---|---|---|
| 5,852,651 | A * | 12/1998 | Fischer | H04W 88/085 379/56.2 |
| 6,192,172 | B1 | 2/2001 | Fatehi et al. | |
| 6,696,917 | B1 * | 2/2004 | Heitner | H04Q 3/68 340/14.2 |
| 7,245,829 | B1 * | 7/2007 | Sindile | H04J 14/0227 398/45 |
| 7,715,722 | B1 * | 5/2010 | Hoke | H04B 10/25758 398/115 |
| 9,287,956 | B2 * | 3/2016 | Campos | H04B 7/022 |
| 9,374,187 | B2 * | 6/2016 | Kim | H04J 14/0236 |
| 9,871,163 | B2 * | 1/2018 | Shim | H04B 7/026 |
| 2001/0048556 | A1 * | 12/2001 | Ranalli | G02F 1/31 359/484.06 |
| 2002/0048067 | A1 * | 4/2002 | Handelman | H04Q 11/0005 398/101 |
| 2003/0072055 | A1 * | 4/2003 | Mickelsson | H04B 10/25754 398/79 |
| 2004/0203704 | A1 * | 10/2004 | Ommodt | H04W 16/26 455/422.1 |
| 2006/0045054 | A1 * | 3/2006 | Utsumi | H04B 10/25754 370/338 |
| 2007/0264015 | A1 * | 11/2007 | Li | H04J 3/1611 398/45 |
| 2010/0061291 | A1 * | 3/2010 | Wala | H04W 4/06 370/312 |
| 2010/0278530 | A1 * | 11/2010 | Kummetz | H04B 10/25753 398/41 |
| 2011/0135308 | A1 * | 6/2011 | Tarlazzi | H04B 7/0413 398/79 |
| 2011/0268449 | A1 * | 11/2011 | Berlin | H04B 10/25753 398/115 |
| 2012/0134666 | A1 * | 5/2012 | Casterline | H04B 10/25754 398/22 |
| 2012/0300771 | A1 * | 11/2012 | Nonaka | H04J 3/0691 370/389 |
| 2013/0223794 | A1 | 8/2013 | Boduch | |
| 2013/0236180 | A1 | 9/2013 | Kim et al. | |
| 2014/0140225 | A1 * | 5/2014 | Wala | H04B 7/0613 370/252 |
| 2014/0161447 | A1 * | 6/2014 | Graves | H04Q 11/0005 398/48 |
| 2014/0219140 | A1 * | 8/2014 | Uyehara | H04B 7/024 370/278 |
| 2015/0139643 | A1 | 5/2015 | Haslam et al. | |
| 2015/0289035 | A1 * | 10/2015 | Mehrvar | H04L 49/356 398/51 |

OTHER PUBLICATIONS

International Bureau, "International Preliminary Report on Patentability from PCT Application No. PCT/US2019/027325", from Foreign Counterpart to U.S. Appl. No. 16/383,264, filed Oct. 22, 2020, pp. 1 through 10, Published: WO.

Chang, Chia-Yu et al., "5G Prgrammable Infrastructure Converging Disaggregated Network and Compute Resources/State of the Art and Initial Function Design", http://www.5g-picture-project.eu/, 5G-Picture, Document No.. D4.1, Version 1.0, Delivery Date: Feb. 28, 2018 (Apr. 4, 2018), pp. 1 thorugh 105.

European Patent Office, "Extended European Search Report from EP Application No. 19784563.9", from Foreign Counterpart to U.S. Appl. No. 16/383,264, dated Dec. 6, 2021, pp. 1 through 14, Published: EP.

* cited by examiner

CONFIGURABLE WIDE AREA DISTRIBUTED ANTENNA SYSTEM

CROSS-REFERENCE TO RELATED APPLICATIONS

This application claims priority to U.S. Provisional Application Ser. No. 62/657,604, same title herewith, filed on Apr. 13, 2018, which is incorporated in its entirety herein by reference.

BACKGROUND

Wireless cellular service providers use base stations to implement wireless communication links with user equipment, such as mobile phones. In particular, a base station is typically in communication with one or more antennas that receive and transmit radio frequency signals to and from user equipment. Each base station in turn is in communication with the service provider's core network. The coverage area of a base station is limited by the transmit power of the associated signals. Moreover, the coverage provided by the transmitted signals is influenced by many other factors such as physical obstacles and interference. Hence, wireless coverage in buildings and stadiums has been traditionally poor when served only from conventional "macro" base stations.

One way that a wireless cellular service provider can improve the coverage provided by a given base station or group of base stations is by using a distributed antenna system (DAS). In a typical DAS, radio frequency (RF) signals are transported between a master unit and one or more remote antenna units using one or more transport cables. The master unit is communicatively coupled to one or more base stations.

Traditionally, RF signals transmitted from the base stations (also referred to here as "downlink RF signals") are received at the master unit. The master unit uses the downlink RF signals to generate one or more downlink transport signals that are distributed to one or more of the remote antenna units over the transport cables. Each such remote antenna unit receives a downlink transport signal and generates a version of the downlink RF signals based on the downlink transport signal and causes the generated downlink RF signals to be radiated from at least one antenna coupled to or included in that remote antenna unit. A similar process is performed in the uplink direction. RF signals transmitted are from user equipment (also referred to here as "uplink RF signals"). Each such uplink RF signal is intended for a base station coupled to the master unit. Each remote antenna unit receives uplink RF signals transmitted from user equipment within its associated coverage area.

Each remote antenna unit uses the received uplink RF signals to generate an uplink transport signal that is transmitted from the remote antenna unit to the master unit. The master unit receives uplink transport signals from the various remote antenna units coupled to it. For each base station coupled to the master unit, the master unit combines uplink signals intended for that base station that are received from the various remote antenna units.

For each base station coupled to the master unit, the master unit ultimately generates uplink RF signals from the combined uplink signals for that base station, which are provided to that base station. Each remote antenna unit can be coupled to each master unit either directly or indirectly via one or more intermediate devices (such as another remote antenna unit or an expansion unit). In this way, the coverage of each base station can be expanded using the DAS.

The number of base stations that can served by a given master unit of a DAS has traditionally been limited by the communication capacity of the transport cables used to couple the master unit to the other units of the DAS. In order to serve additional base stations, additional master units have traditionally been added to the DAS. Also, in higher-capacity deployments, the master units of the DAS have been co-located with the base stations. Both of these factors have traditionally imposed constraints on the design and implementation of a DAS.

SUMMARY

The following summary is made by way of example and not by way of limitation. It is merely provided to aid the reader in understanding some of the aspects of the subject matter described. Embodiments provide configurable wide area distributed antenna systems that are dynamically configurable and easily expanded as needed.

In one embodiment, a configurable wide area distributed antenna system is provided. The configurable wide area distributed antenna system includes at least one remote master unit, at least one local master unit, at least one communication link. At least one remote transport media interface and at least one remote transport media interface. The at least one remote master unit is in communication with at least one base station. The at least one remote master unit includes a remote switch function that provides at least one of multiplexing in a downlink direction, demultiplexing in an uplink direction and routing of digital samples. The least one local master unit is located remote from the at least one remote master unit. The at least one local master unit is in communication with at least one remote antenna unit used to provide communication coverage in a select coverage area. The at least one local master unit includes a local switch function providing at least one of demultiplexing in a downlink direction, multiplexing in an uplink direction and routing of digital samples. The at least one remote transport media interface is configured to interface signals between the remote switch function of the at least one remote master unit and the at least one communication link. The at least one local transport media interface is configured to interface signals between the local switch function of the local master unit and the at least one communication link.

In another example embodiment, another configurable wide area distributed antenna system is provided. The configurable wide area distributed antenna system includes at a plurality of remote master units, a plurality of local master units, at least one communication link, a remote wavelength division multiplexer for each remote master unit, a local wavelength division multiplexer for each local master unit and a wavelength selective switch. Each remote master unit is in communication with at least one associated base station. Each remote master unit including a remote switch function and at least one remote transport media interface. Each local master unit is positioned in a location that is remote to each of the plurality of the remote master units. Each local master unit is in communication with at least one remote unit that used to provide communication coverage in a select coverage area. Each local master unit includes a local switch function and at least one local transport media interface. The at least one communication link couples transport signals between the plurality of remote master units and the plurality of local master units. Each wavelength division multiplexer is configured and arranged to multiplex signals into the transport signals in a downlink direction from the at least one remote transport interface of an associated remote master unit and the at least one communication link and demultiplex transport signals in an uplink direction from the at least one communication link to the at least one remote transport interface of the remote master unit. Each local wavelength division multiplexer is configured and arranged to demultiplex the transport signals in the downlink direction from the at least one communication link to the local transport media interface of the at least one local master unit and multiplex signals into the transport signals in the uplink direction from the at least one local transport media interface of the at least one local master unit to the at least one communication link. The wavelength selective switch is configured and arranged to selectively route the transport signals through the at least one communication link.

In yet another embodiment, a method of operating a distributed antenna system is provided. The method includes communicating base station signals between at least one base station and an associated remote master unit. The associated remote master unit is located at a first location. The method further includes communicating remote unit transport signals between at least one remote unit used for communication coverage at a select communication coverage area and an associated local master unit. The associated local master unit is located at a second different location than the first location of the associated remote master unit. At least one communication link is used to communicate transport signals between at least one remote master unit that includes the associated remote master unit and at least one local master unit that includes the associated local master unit.

In still another embodiment, a method of operating a distributed antenna system having a plurality of remote master units and a plurality of local master units with each remote master unit at a different location and each local master unit located at different location while being a spaced distance from the location of each remote master unit is disclosed. Each local master unit of the distributed antennas system is associated with a different communication coverage area. The method includes in a downlink direction; processing downlink base signals at associated remote master units into downlink multiplexed remote digital samples. The downlink multiplexed remote digital samples are interfaced to create downlink optical master unit transport signals having assigned wavelengths that indicate signal routing information. The downlink optical master unit transport signals are routed to select local master units with a wavelength selective switch over at least one communication link. Received downlink optical master unit transport signals are processed at the select local master units to generate downlink remote antenna unit transport signals. The downlink remote antenna unit transport signals are communicated to at least one associated remote unit. Associated downlink analog radio frequency signals are broadcast from at least one antenna that is in communication with the at least one associated remote unit. In an uplink direction, the method processes uplink remote antenna unit transport signals at associated local master units to generate uplink multiplexed digital samples. The uplink multiplexed local digital samples are interfaced to create uplink optical master unit transport signals having the assigned wavelengths that indicate signal routing information. The uplink optical master unit transport signals are routed to select remote master units with the wavelength selective switch over the at least one communication link. Received uplink optical master unit transport signals are processed at the select remote master units to generate uplink base signals. The uplink base signals are communicated to associated base stations.

BRIEF DESCRIPTION OF THE DRAWINGS

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

As noted above, in traditional DAS deployments, each master unit (MU) is deployed at a single location and is collocated with the base stations. However, in embodiments described below, the functionality of the master unit is implemented in a distributed manner and is deployed at different locations. Some of the master-unit functionality is deployed near (that is, is collocated with) one or more base stations while other master-unit functionality is deployed remotely from the one or more base station and nearer one or more remote antenna units (RAUs) of the DAS.

Figure 1:
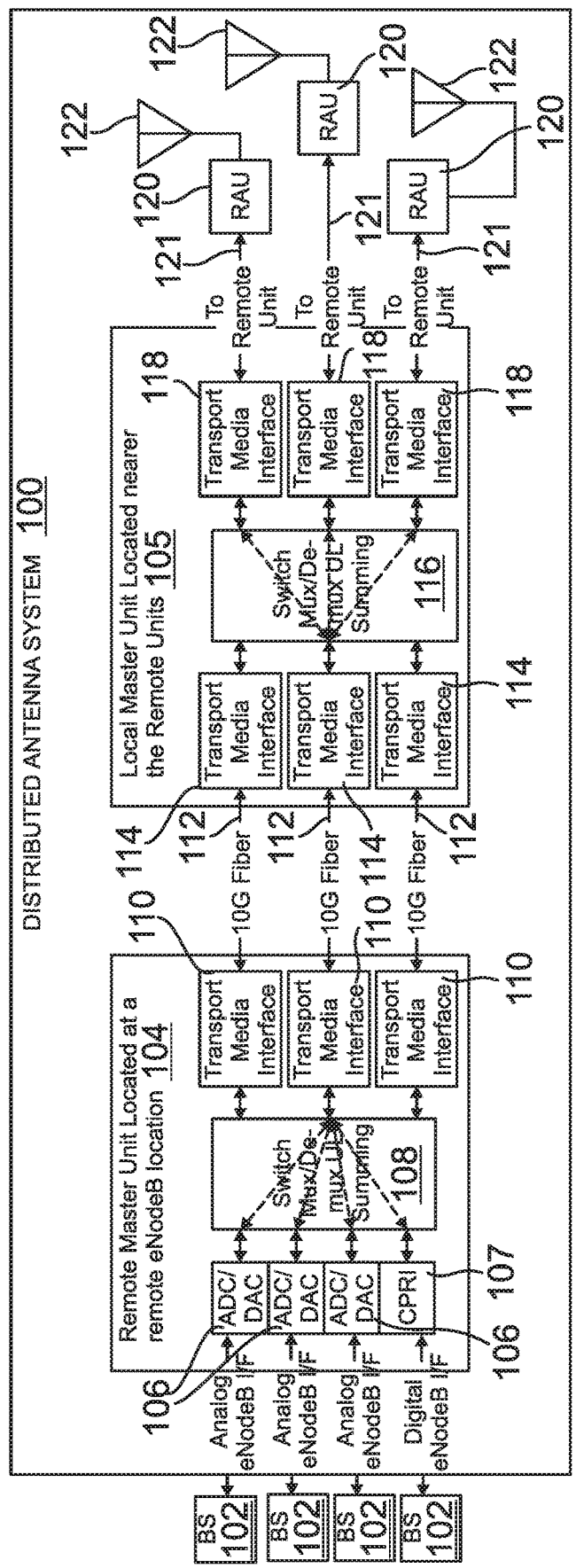
FIG. 1 is an illustration of a wide area distributed antenna system including a remote master unit and a local master unit at different locations according to one exemplary embodiment.

Referring to FIG. 1, a block diagram of a DAS 100 of an example embodiment is illustrated wherein the distributed master unit functionally is deployed at two different locations. In this example embodiment, the MU functionality includes a remote master unit 104 (R-MU) and a local master unit 105 (L-MU). The R-MU 104 can be collocated with the eNodeBs (or also referred to here as base stations) 102. The L-MU 105 is located nearer (relative to the R-MU 104) the remote antenna units 120 of the DAS 100.

The DAS 100 can use either digital transport, analog transport, or combinations of digital and analog transport for transporting RF signals throughout the DAS 100. The embodiments shown in FIGS. 1-12 are described below as using digital transport; however, it is to be understood that analog transport or combinations of digital and analog transport can be used.

The R-MU 104 and L-MU 105 can be communicatively coupled to each other by one or more communication links 112. The R-MU 104 and L-MU 105 in this embodiment can also be referred to as a "point-to-point distributed master unit" (P2P DMU). Multiple communication links 112 can be used if needed for the required bandwidth. As stated above, the base stations 102 in this example can be collocated with the R-MU 104 while the L-MU 105 is nearer to the remote antenna units 120.

The DAS 100 can interface with the base stations 102 in multiple ways. In the example embodiment of FIG. 1, three of the base stations 102 interface with the DAS 100 using analog radio frequency signals. The R-MU 104 comprises a respective analog-to-digital converter/digital-to-analog converter (ADC/DAC) interface 106 for each of those three base stations 102. Each ADC/DAC interface 106 is configured to, in the downlink direction, convert downlink analog RF signals received from a respective base station 102 to downlink digital samples and, in the uplink direction, convert uplink digital samples into uplink analog RF signals that are provided to the respective base stations 102. The digital samples can be, for example, in the form of digital in-phase (I) and quadrature (Q) samples (though it is to be understood that other embodiments can use other forms of digital samples). Digital IQ samples can be produced from an analog wireless signal received at radio frequency (RF) by down-converting the received signal to an intermediate frequency (IF) or to baseband, digitizing the down-converted signal to produce real digital samples, and digitally down-converting the real digital samples to produce digital IQ samples. These digital IQ samples can also be filtered, amplified, attenuated, and/or re-sampled or decimated to a lower sample rate. The digital samples can be produced in other ways. Likewise, an analog wireless signal can be produced from digital IQ samples by digitally up-converting the digital IQ samples to produce real digital samples, performing a digital-to-analog process on the real samples in order to produce an IF or baseband analog signal, and up-converting the IF or baseband analog signal to the desired RF frequency. The digital IQ samples can also be filtered, amplified, attenuated, and/or re-sampled or interpolated to a higher sample rate. The analog signal can be produced in other ways (for example, where the digital IQ samples are provided to a quadrature digital-to-analog converter that directly produces the analog IF or baseband signal). The portion of wireless spectrum represented by the digital samples can include, for example, a band of wireless spectrum, a sub-band of a given band of wireless spectrum, or an individual wireless carrier. The digital samples that are communicated in the DAS 100 are also referred to here as "digital transport data" or just "transport data."

Also, in the exemplary embodiment shown in FIG. 1, one of the base stations 102 interfaces with the DAS 100 using digital baseband data. For example, the digital baseband data can be digital baseband data complying with standard baseband protocol such as the Common Public Radio Interface (CPRI) protocol, the Open Radio Equipment Interface (ORI) protocol, the Open Base Station Standard Initiative (OBSAI) protocol, or other protocol. In the example shown in FIG. 1, the R-MU 104 comprises a digital baseband interface 107. The digital baseband interface 107 is configured to, in the downlink direction, receive, from the base station 102, downlink digital baseband data formatted according to the baseband protocol (for example, the CPRI protocol) used by that base station 102 and convert the received downlink digital baseband data to digital data compatible with the format used in the DAS 100 and, in the uplink direction, convert uplink digital data compatible with the format used in the DAS 100 to uplink digital baseband data formatted according to the baseband protocol used by the base station 102 (for example, the CPRI protocol). The resulting uplink digital baseband data is provided to the base station 102. Converting between the digital baseband data format used by the base station 102 and the digital data format used in the DAS 100 can include digitally filtering, amplifying, attenuating, re-sampling, interpolating, decimating, re-clocking, or otherwise digitally processing the digital samples.

Each R-MU 104 also includes a remote switch function 108 and one or more remote transport media interfaces 110. Each of the remote transport media interfaces 110 is configured to transmit downlink transport signals to a L-MUs 105 via a respective communication link 112. Each of the remote transport media interfaces 110 is also configured to receive uplink transport signals transmitted from the L-MU 105 via the respective communication link 112. The switch function 108 is configured to, for each transport media interface 110, multiplex downlink transport data from one or more of the base stations coupled to that R-MU 104 and provide the multiplexed transport data to that transport media interface 110 for communication to the respective L-MU 105 via the respective communication link 112.

Each L-MU 105 includes one or more transport media interfaces 114. Each transport media interface 114 is configured to receive downlink transport signals transmitted from the R-MU 104 via a respective communication link 112. Each transport media interface 114 is also configured to transmit uplink transport signals communicated to the L-MU 105 via the respective communication link 112. The transport media interfaces 114 of each L-MU 105 that are used to couple that L-MU 105 to a R-MU 104 are also referred to here as the "R-MU transport media interfaces 114," and the transport signals communicated over the communication link 112 between each L-MU 105 and a R-MU 104 are also referred to here as "R-MU transport signals."

Each L-MU 105 also includes a local switch function 116 and one or more transport media interfaces 118. Each transport media interface 118 is configured to transmit downlink transport signals transmitted to one or more RAUs 120 via one or more communication links 121. Each transport media interface 118 is also configured to receive uplink transport signals communicated to the L-MU 105 via the respective communication link 112 from the one or more RAUs 120. The transport media interfaces 118 of each L-MU 105 that are used to couple that L-MU 105 to one or more RAUs 120 are also referred to here as the "RAU transport media interfaces 118," and the transport signals communicated over the communication link 112 between each L-MU 105 and the one or more RAUs 120 are also referred to here as "RAU transport signals."

The local switch function 116 is configured to, for each R-MU transport media interface 114, demultiplex (separate out) the multiplexed downlink transport data from the various base stations 102 that are received at that R-MU transport media interface 114. The switch function 116 is also configured to, for each RAU transport media interface 118, multiplex downlink transport data originating from one or more of the base stations 102 and provide the multiplexed transport data to that RAU transport media interface 118 for communication to one or more RAUs 120 via at least one communication link 121.

Each remote antenna unit 120 is configured to receive the downlink RAU transport signal communicated to it over the respective communication link 121, demultiplex (separate out) the multiplexed downlink transport data originating from the various base stations 102, and generate respective corresponding downlink analog radio frequency signals from the downlink transport data originating from the various base stations 102. The generated downlink analog radio frequency signals are then combined, power amplified, and radiated from one or more antennas 122 included in, coupled to, or otherwise associated with that remote antenna unit 120 for reception by user equipment (UE) (not shown).

In an uplink direction, analog uplink radio frequency signals are transmitted from user equipment. Each uplink radio frequency signal is ultimately intended for one or more of the base stations 102. At each RAU 120, uplink radio frequency signals are received via the one or more antennas 122 that are included in, coupled to, or otherwise associated with that RAU 120. Each received analog uplink radio frequency signal received at each RU 120 is converted into uplink digital samples in the RAU 120 as described above. As noted above, the digital samples that are communicated in the DAS 100 are also referred to here as "digital transport data" or just "transport data." In each RAU 120, the uplink digital transport data that is intended for the various base stations 102 is multiplexed together. The multiplexed uplink digital transport data is transmitted over the communication link 121 to the associated L-MU 105, where a respective RAU transport media interface 118 receives the corresponding RAU uplink transmit signal via which the multiplexed uplink digital transport data is communicated.

At each L-MU 105, the respective switch function 116 is configured to, for each RAU transport media interface 118, demultiplex (separate out) the uplink digital transport data intended for the various base stations 102. The switch function 116 is also configured to, for each base station 102, sum corresponding uplink digital samples intended for that base station 102 included in the uplink digital data received from the various RAUs 120 and, for each R-MU transport media interface 114, multiplex (combine) the summed uplink digital transport data for the base stations 102 that are coupled to the R-MU 104 coupled to that R-MU transport media interface 114 and provide the multiplexed uplink digital transport data to that R-MU transport media interface 114 for communication to the corresponding R-MU 104 via the respective communication link 112. Each of the corresponding uplink R-MU transport signals is received by a respective transport media interface 110 at the R-MU 104.

At each R-MU 104, the respective switch function 108 is configured to, for each transport media interface 110, demultiplex (separate out) the uplink digital transport data intended for the various base stations 102 coupled to that R-MU 104. The switch function 108 is also configured to, for each such base station 102, sum the corresponding uplink digital samples intended for that base station 102 included in the uplink digital data received from the various L-MUs 105 and the resulting summed uplink digital transport data is provided to the appropriate ADC/DAC interface 106 or digital baseband interface 107 for the corresponding base station 102. Each of the ADC/DAC interfaces 106 converts the corresponding summed uplink digital transport data into an appropriate analog uplink radio frequency signal, which is communicated to the corresponding base station 102. Each digital baseband interface 107 converts the corresponding summed uplink digital transport data into appropriate uplink digital baseband data, which is communicated to the corresponding base station 102.

The switch function 108 in each R-MU 104 and the switch function 116 in each L-MU 105 enable downlink digital transport data for the various base stations 102 to be selected, combined (multiplexed), and communicated to the various RAUs 120 and enable uplink digital transport data received from the various RAUs 120 to be selected, multiplexed, summed, and communicated to the various base stations 102. In this way, a mechanism to dynamically and selectively route base station capacity to and from the various RAUs 120 in the DAS 100 can be provided, while providing increased transport capacity between the R-MUs 104 and the L-MUs 105 using multiple communication links 112.

Figure 2:
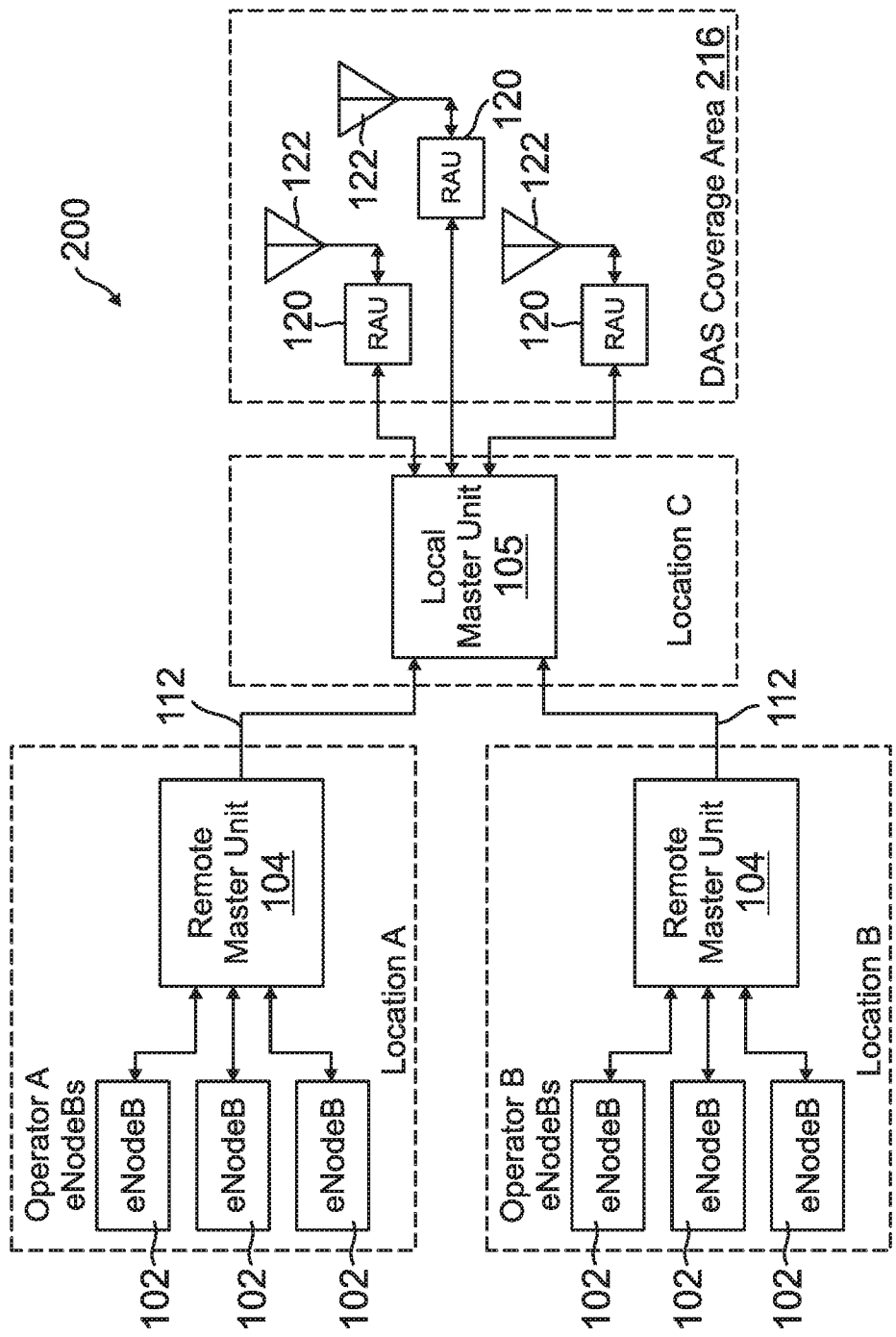
FIG. 2 is an illustration of a wide area distributed antenna system having a multipoint-to-point distributed master unit configuration according to one exemplary embodiment.
Figure 3:
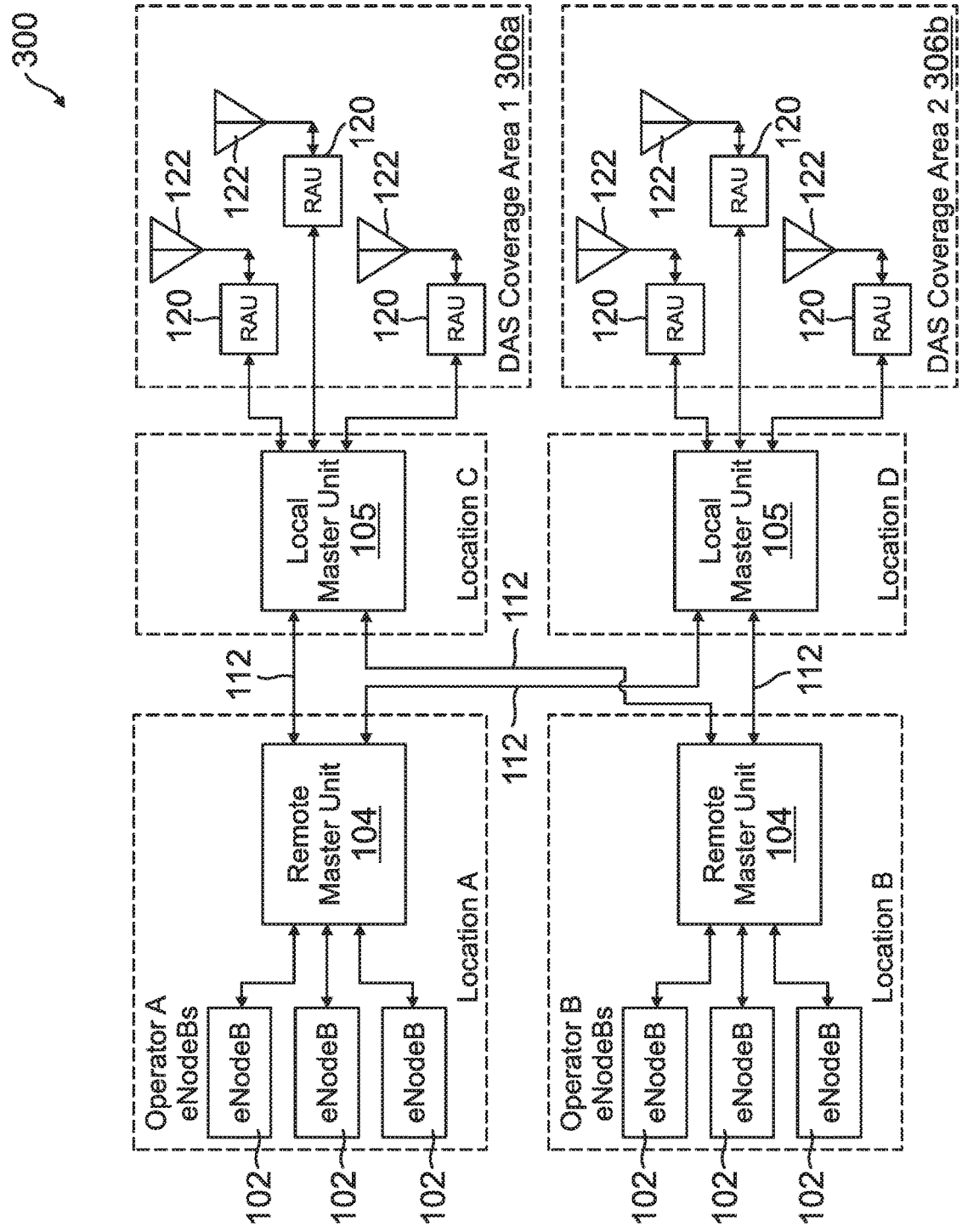
FIG. 3 is an illustration of a wide area distributed antenna system having a multipoint-to-multipoint distributed master unit configuration according to one exemplary embodiment.

In the examples described here in connection with FIGS. 1-3, each communication link 112 and 121 comprises a logical bi-directional communication link and is depicted using a single line for ease of illustration. It is to be understood however that each such logical bi-directional communication link 112 and 121 can be physically implemented in many ways. For example, each such logical bi-directional communication link can be implemented using one or more physical communication links (for example, one or more 10 Gigabit Ethernet fiber or copper cables), the number of which depends on the amount of transport capacity needed between the associated units and whether or not each such physical communication link is a full duplex link or not. Also, power can be provided to units over the physical communication links used to implement the communication links 112 or 121 (for example, power can be provided to the RAUs 120 over the physical communication links coupled to the RAUs 120 using, for example, Power-over-Ethernet techniques).

The functionality described here as being included in each R-MU 104, each L-MU 105, and each RAU 120, as well as the DAS 100 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. The functionality described here as being included in each R-MU 104, L-MU 105, and RAU 120, as well as the DAS 100 more generally, can be implemented in other ways.

In the example shown in FIG. 1, the capacity provided by the various base stations 102 and the coverage provided by the various remote antenna units 120 can be selectively and dynamically routed among the various elements of the DAS 100 via switching functions 108 and 116 implemented in the R-MU 104 and L-MUs 105. That is, this selective and dynamic routing is implemented "electronically" by the switching functions 108 and 116 selecting which digital transport data will be used to produce the signals transmitted from the various interfaces of each remote and local master unit 104 and 105. However, in other embodiments, selective and dynamic routing can occur optically.

In the embodiment shown in FIG. 1, one remote master unit 104 is coupled to one local master unit 105 using multiple communication links 112. That is, the DAS 100 of FIG. 1 has a point-to-point distributed master unit configuration. However, since each remote and local master unit 104 and 105 includes multiple transport media interfaces 110 and 114, respectively, other topologies for the distributed master unit functionality can be used. For example, each remote master unit 104 can be coupled to multiple local master units 105, where each of the multiple local master units 105 can be coupled to the remote master unit 104 via a respective one or more communication links 112 and transport media interfaces 110. Likewise, each local master unit 105 can be coupled to multiple remote master units 104, where each of the multiple remote master units 104 can be coupled to the local master unit 105 via a respective one or more communication links 112 and transport media interfaces 114.

FIG. 2 is a block diagram illustrating one example of a DAS 200 having a distributed master unit configuration in which multiple remote master units 104 are coupled to a single local master unit 105. That is, the DAS 200 has a multipoint-to-point distributed master unit (M2P MU) configuration. In the example shown in FIG. 2, two remote master units 104 and groups of base stations 102 are shown (but it is to be understood that other numbers of remote master units 104 and groups of base stations 102 can be used).

Each of the multiple remote master units 104 is located at a location that is different and remote from the location where each of the other remote master units 104 and the local master unit 105 is located. Each of these locations can be several kilometers from each other. As shown in FIG. 2, each of the multiple remote master units 104 is co-located with a respective set of base stations 102. The local master unit 105 is located so as to serve a set of remote antenna units 120 that provide a respective DAS coverage area. Each of the multiple remote master units 104 is coupled to the local master unit 105 via a respective one or more communication links 112 and transport media interfaces 114 via the switching functions 108 and 116 (not shown in FIG. 2) implemented in the remote master units 104 and the local master unit 105.

The capacity provided by the various base stations 102 at the various locations can be selectively and dynamically routed among the various remote antenna units 120 and the coverage provided by the various remote antenna units 120 can be selectively and dynamically routed among the various base stations 102 at the various locations. This is done by the switching functions 108 and 116 (not shown in FIG. 2) implemented in the remote master units 104 and the local master unit 105. The various groups of base stations 102 do not need to be co-located together for this to occur. This configuration is well suited for use where multiple wireless service providers, having base stations located at different locations, wish to make use of the DAS to provide service within the coverage area 216 of the DAS.

FIG. 3 is a block diagram illustrating one example of a DAS 300 having a distributed master unit configuration in which multiple remote master units 104 are coupled to multiple local master units 105. That is, the DAS 300 has a multipoint-to-multipoint distributed master unit (M2M MU) configuration. In the example shown in FIG. 3, two remote master units 104, two groups of base stations 102, and two local master units 105 are shown (but it is to be understood that other numbers of master units 104, groups of base stations 102, and/or local master units 105 can be used).

Each of the multiple remote master units 104 and multiple local master units 105 is located at a location that is different and remote from the location where each of the other remote master units 104 and local master units 105 are located. Each of these locations can be several kilometers from each other. As with the example shown in FIG. 2, in the example shown in FIG. 3, each of the multiple remote master units 104 is co-located with a respective set of base stations 102. Each local master unit 105 is located so as to serve a respective set of remote antenna units 120 that provide a respective DAS coverage area. Each of the multiple remote master units 104 is coupled to each of the local master units 105 via a respective one or more communication links 112 and transport media interfaces 114.

The capacity provided by the various base stations 102 at the various locations can be selectively and dynamically routed among the various remote antenna units 120 at the various locations and the coverage provided by the various remote antenna units 120 the various locations can be selectively and dynamically routed among the various base stations 102 at the various locations. This is done by the switching functions 108 and 116 (not shown in FIG. 3) implemented in the remote master units 104 and the local master units 105. The various groups of base stations 102 do not need to be co-located together for this to occur. This configuration is well suited for use where multiple wireless service providers, having base stations located at different locations, all wish to make use of DAS coverage areas provided at different locations (for example, at multiple buildings).

Other configurations are possible. In one such example, a DAS can have a distributed master unit configuration in which a single remote master unit 104 is coupled to multiple local master units 105.

In the examples shown above in connection with FIGS. 1-3, each communication link 112 comprises a logical bi-directional communication link and is depicted using a single line for ease of illustration.

It is to be understood however that each such logical bi-directional communication link 112 can be physically implemented in many ways.

Figure 4:
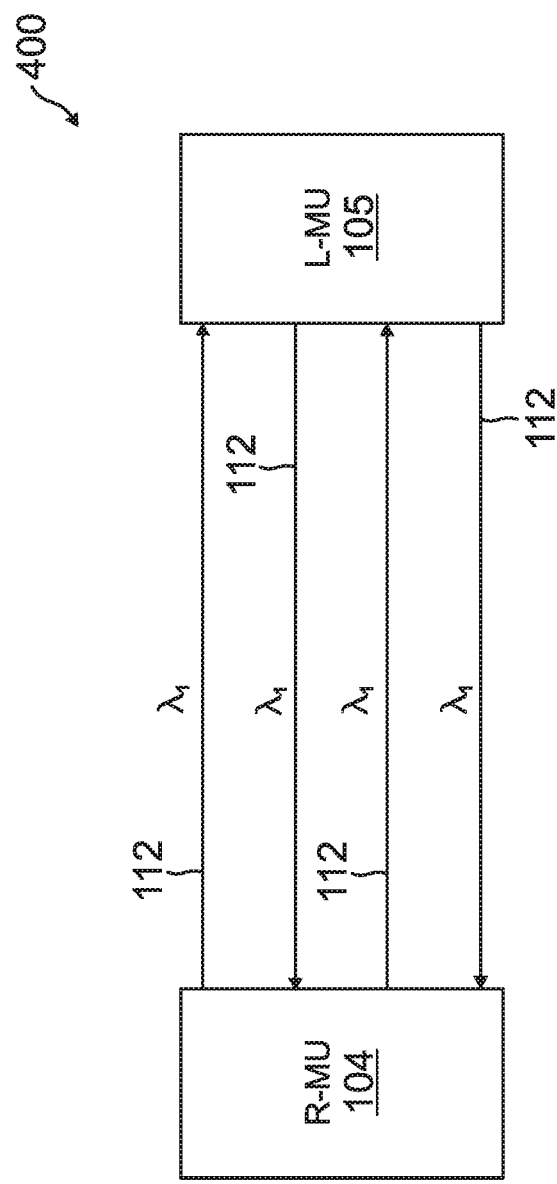
FIG. 4 is an illustration of a multiple optical link configuration according to one exemplary embodiment.

For example, each such logical bi-directional communication link 112 can be physically implemented using a first set of communication media for downlink transport signals and a second set of communication media for uplink transport signals. One example of such an approach is illustrated in FIG. 4. In the example shown in FIG. 4, each communication link 112 is implemented using a first set of communication media (such as a first set of fibers) for communicating downlink transport signals from the R-MU 104 to the L-MU 105 and a second set of communication media (such as a second set of fibers) for communicating uplink transport signals from the L-MU 105 to the R-MU 104. In this example, the downlink and uplink transport signals are communicated over each fiber 112 using the same optical wavelength $\lambda_1$.

In other examples, each logical bi-directional communication link 112 provided between a remote master unit 104 and a local master unit 105 can be physically implemented so that the same set of communication media is used for communicating both downlink transport signals and uplink transport signals. In some of those examples where multiple communication links 112 are provided between a remote master unit 104 and a local remote unit 105, each logical bi-directional communication link 112 can be implemented using a different set of physical communication media that is used for communicating both downlink transport signals and uplink transport signals. In other examples where multiple communication links 112 are provided between a remote master unit 104 and a local remote unit 105, multiple bi-directional communication links 112 can be implemented together using the same set of physical communication media that is used for communicating both downlink transport signals and uplink transport signals. One example of the latter approach is illustrated in FIG. 5, where optical wavelength-division multiplexing is used.

Figure 5:
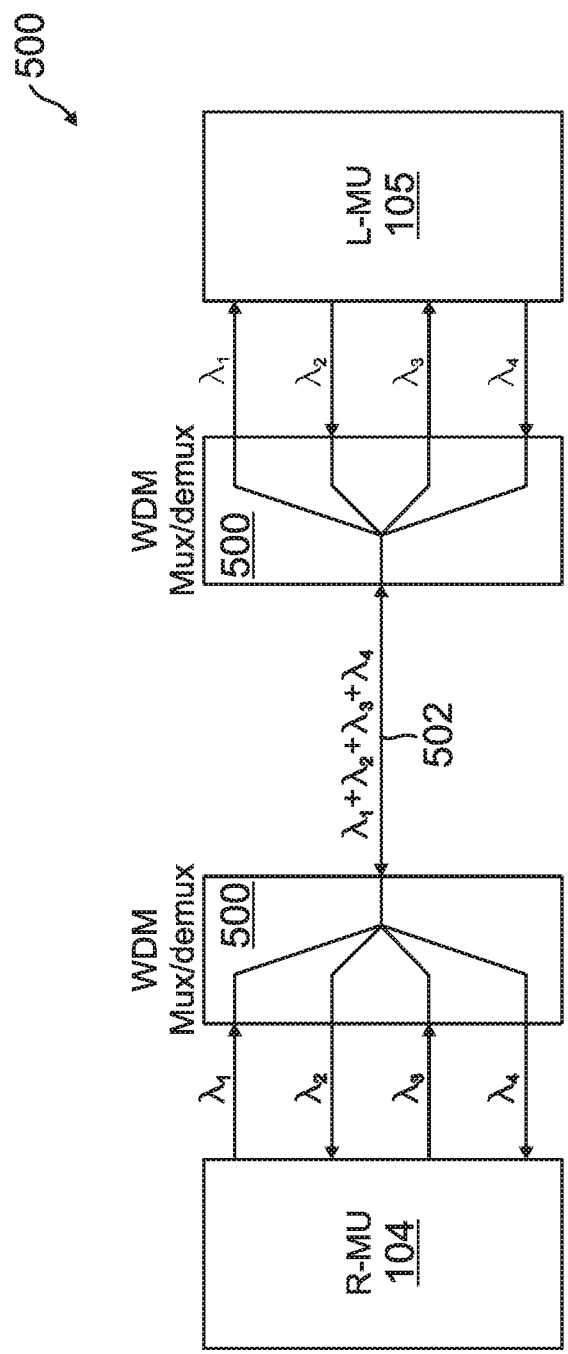
FIG. 5 is an illustration of a wavelength division multiplexing system for multiple wavelengths over a single fiber according to one exemplary embodiment.

In the example shown in FIG. 5, each of the downlink and uplink transport signals sent and received by the transport media interfaces 110 and 114 (not shown in FIG. 5) of the remote and local master units 104 and 105 is communicated using a respective unique optical wavelength. In this example, the remote master unit 104 includes two transport media interfaces 110, a first one of which transmits downlink transport signals on a first optical wavelength $\lambda_1$ and receives uplink transport signals on a second optical wavelength $\lambda_2$ and the second one of which transmits downlink transport signals on a third optical wavelength $\lambda_3$ and receives uplink transport signals on a fourth optical wavelength $\lambda_4$. Likewise, the local master unit 105 includes two transport media interfaces 114, a first one of which receives the downlink transport signals on the first optical wavelength $\lambda_1$ and transmits the uplink transport signals on the second optical wavelength $\lambda_2$ and the second one of which receives the downlink transport signals on the third optical wavelength $\lambda_3$ and transmits the uplink transport signals on the fourth optical wavelength $\lambda_4$. The various optical wavelengths are optically multiplexed and demultiplexed using a pair of wavelength division multiplexers 500, a first one of which is deployed with the remote master unit 104 and a second one of which is deployed with the local master unit 105. The multiplexed optical signals are communicated over a single set of communication media (a single fiber 502 in this example).

In the examples shown in FIGS. 4 and 5, each transport media interface 110 and 114 of the remote master units 104 and the local master units 105 is configured to modulate transmitted digital data onto an optical carrier having a selected optical wavelength and to demodulate received digital data that was modulated onto an optical carrier having a selected optical wavelength. Each such transport media interface 110 and 114 can comprise a small form-factor pluggable (SPF) optical transceiver. In examples where wavelength-division multiplexing is used, each transport media interface 110 and 114 is configured so that any output optical signal transmitted by that interface 110 and 114 has an optical wavelength that differs from the optical wavelength of any other optical signal communicated over any optical fiber that the optical signal traverses. Moreover, wavelengths can be reused in the system as long as signals using the same wavelength do not traverse the same fiber at the same time.

Also, in the example shown in FIG. 5, only a single a wave-division multiplexor is coupled to each remote or local master unit 104 and 105 to multiplex and demultiplex transport signals for all of the transport media interfaces 110 or 114. However, if additional transport capacity or routing flexibility is needed, multiple wave-division multiplexors can be coupled to one or more of the remote or local master units 104 and 105, where each wave-division multiplexor can be used to multiplex and demultiplex transport signals for a respective subset of the transport media interfaces 110 or 114.

In general, the amount of transport capacity that is provided between a remote master unit 104 and a local master unit 105 (that is, the number of transport media interfaces 110 and 114 and communication links 112) is determined by the amount of base station capacity that will be transported between the remote master unit 104 and the local master unit 105.

In a DAS having a M2M DMU configuration (such as the DAS 300 described above in connection with FIG. 3), it may be advantageous to be able to selectively and dynamically allocate the base-station capacity provided by all of the various base stations among the various L-MUs (and associated coverage areas). The number of mobile users served by each L-MU and associated coverage area may vary. Moreover, the total number of base stations necessary to collectively serve all of the of L-MUs may be reduced if the base-station capacity provided by the base stations can be dynamically routed to different L-MUs depending upon the number of mobiles users served by each L-MU and associated coverage area. For instance, a DAS using a M2M DMU configuration may serve a large hotel and nearby convention center. During early morning and evening hours, more users are in the hotel, whereas during the day, more users are at the convention center. Being able to dynamically route base station capacity to different venues can reduce the total number of base stations used to provide capacity to the entire site.

To provide such dynamic routing capability, there must be enough transport bandwidth from each R-MU to each L-MU to carry the amount of base-station capacity needed for the maximum number of users served by that L-MU and associated coverage area. If optical multiplexing is not used, it could be the case that a large number of fibers will need to be provided between each R-MU and each L-MU, thereby requiring a complex network of fibers to be provided to implement the communication links 112. An example of DAS using a M2M DMU configuration where optical multiplexing is not used is illustrated in FIGS. 6A-6C.

Figure 6A:
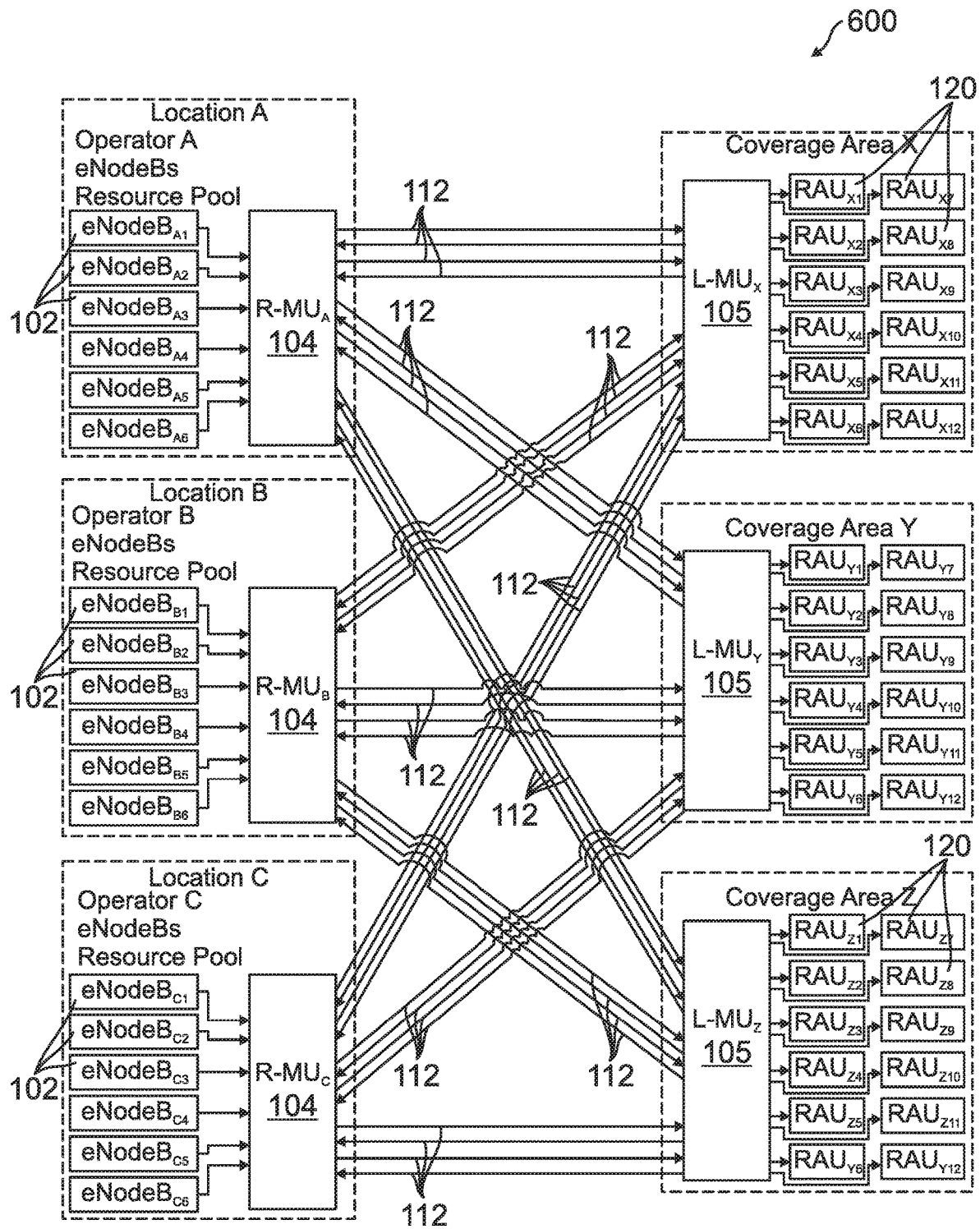
FIG. 6A is an illustration of a wide area distributed antenna system configuration according to one exemplary embodiment.
Figure 6B:
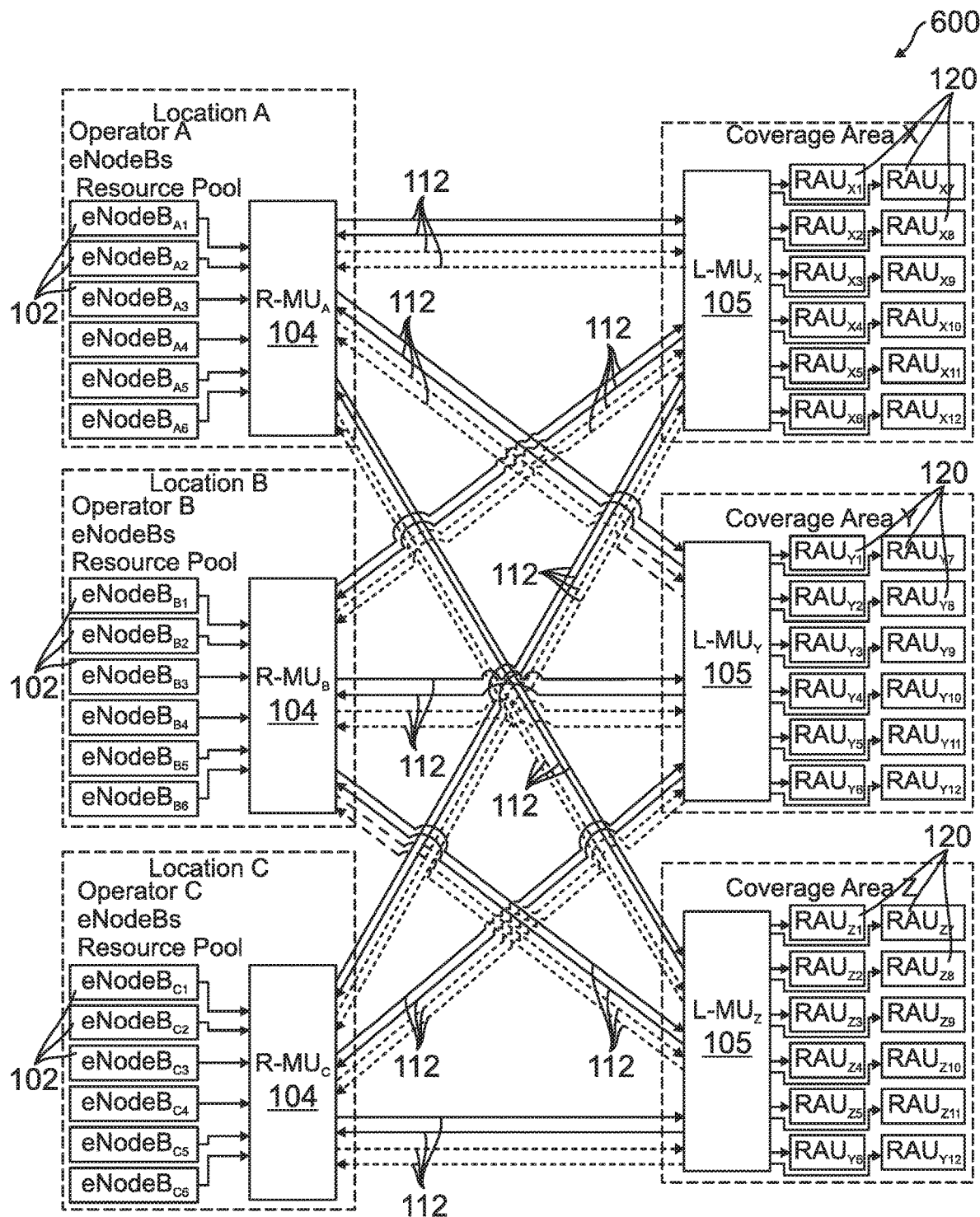
FIG. 6B is an illustration of the wide area distributed antenna system configuration of 6A under normal conditions with the bandwidth for two base stations being carried by one fiber pair to each local master unit while the other fiber pair is idle according to one exemplary embodiment.
Figure 6C:
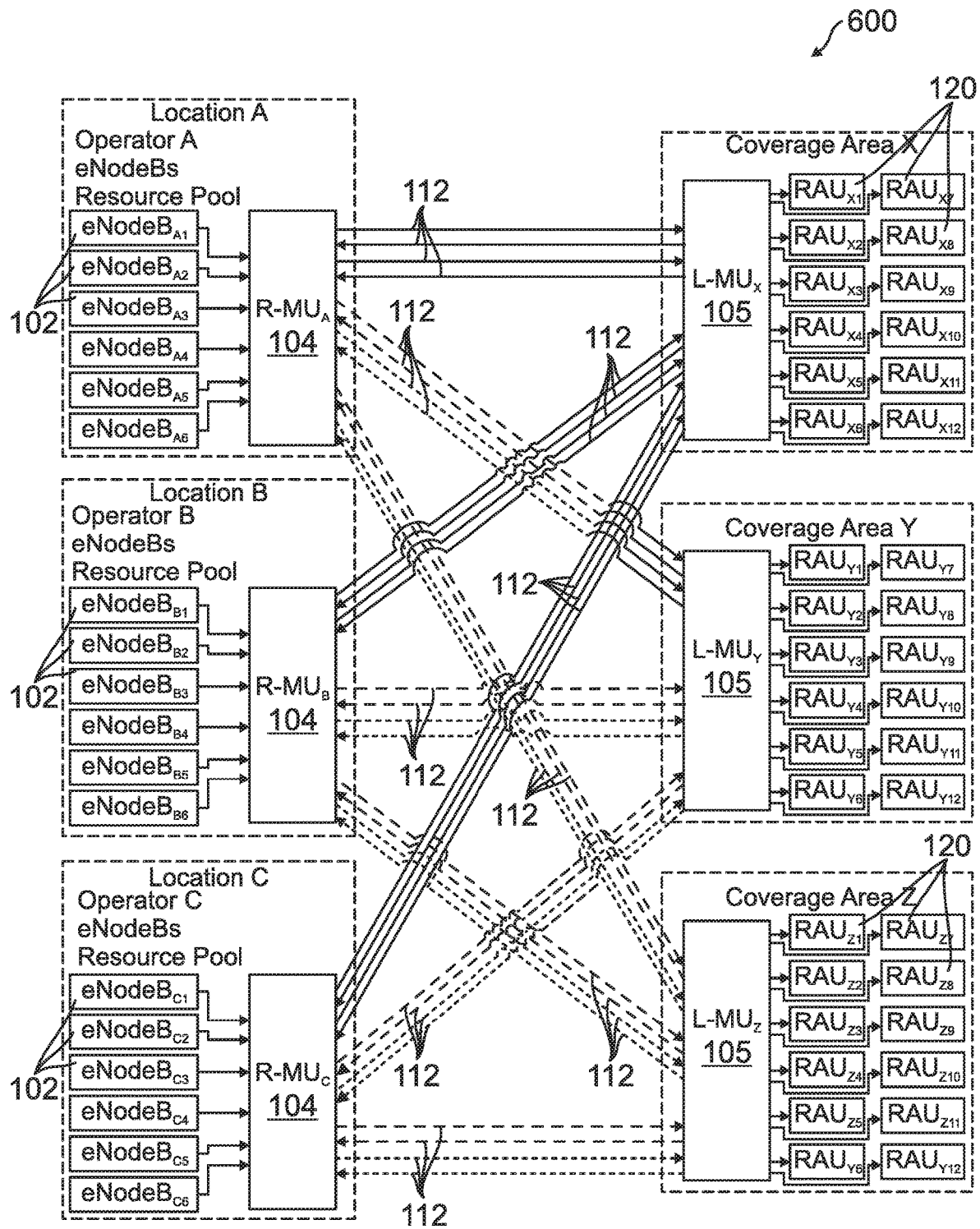
FIG. 6C is an illustration of the wide area distributed antenna system configuration of 6A during a dynamically rerouting of resources to accommodate usage changes in the coverage areas according to one exemplary embodiment.

In the example shown in FIGS. 6A-6C, a DAS 600 having a M2M DMU configuration is used to enable three wireless operators to distribute base-station capacity among three different DAS coverage areas. Each wireless operator has multiple base stations 102 deployed at a respective base-station location. A separate remote master unit 104 is deployed at each base-station location and is coupled to the base stations 102 deployed at that base-station location. The base-station locations are individually referred to here as location A, location B, and location C.

Each of the three DAS coverage areas are provided at three different coverage locations. The coverage areas are individually referred to here as coverage area X, coverage area Y, and coverage area Z. A separate local master unit 105 is deployed at each coverage location. In this example, DAS equipment deployed at each coverage location is configured to be able to use the capacity provided by up to four base stations 102 from each wireless operator.

In this example, each communication link 112 is implemented using a pair of optical fibers, one of which is used for communicating downlink transport signals and the other of which is used for communicating uplink transport signals. Also, each communication link 112 has sufficient transport bandwidth to transport the base-station capacity for up to two base stations 102. Therefore, given all of this, in order to be able to transport the maximum base-station capacity for each wireless operator (the capacity of four base stations 102) between the remote master unit 104 at each base-station location and the local master unit 105 at each coverage location, two communication links 112 are provided between each remote master unit 104 and local master unit 105. As noted above, in this example, each communication link 112 is implemented using a pair of optical fibers. Therefore, four optical fibers are provided between each remote master unit 104 and local master unit 105.

In this example, as shown in FIG. 6B, under normal conditions, the capacity of two base stations 102 from each wireless operator is provided to each of the coverage locations. Since each communication link 112 (implemented using a pair of optical fibers) has sufficient transport bandwidth to transport this amount of bandwidth capacity, only one of the communication links 112 will be used during normal conditions, with the other communication link 112 being idle. That is, during normal conditions, one half of the optical fibers provided in the overall system are idle. In FIG. 6B, the fibers used to supply base station capacity from two base stations 102 are shown using solid lines, and the idle fibers are shown using dotted lines.

As noted above, the distributed master unit functionality described above has the ability to selectively and dynamically route base state capacity as needed. For example, if the number of users at coverage area X increases to twice the usual number of users, while the number of users at the other two coverage areas Y and Z decreases, then the distributed master unit functionality can be used to dynamically route additional base-station capacity from each wireless operator to the coverage area X, while decreasing the amount of base-station capacity provided from each wireless operator to the other two coverage areas Y and Z. More specifically, in this example, the capacity provided to the coverage area X is increased to the amount provided by four base stations 102 from each wireless operator, while the capacity provided to each of the other two coverage areas Y and Z is decreased to the amount provided by one base station 102 from each wireless operator. In FIG. 6C, the fibers used to supply base station capacity from two base stations 102 are shown using solid lines, the fibers used to supply base station capacity from one base station 102 are shown using dashed lines, and the idle fibers are shown using dotted lines.

Implementing the various communication links 112 provided between the remote master units 104 and the local master units 105 without using wave-division multiplexing as shown in FIGS. 6A-6C may result in a significant number of the optical fibers remaining idle most of the time. It may be desirable to reduce the number of optical fibers used to implement the various communication links 112. As described above in connection with FIG. 5, wave-division multiplexers can be deployed at each remote and local master unit 104 and 105 in order to reduce the number of optical fibers that are used to implement the communication links 112 used for providing transport bandwidth.

Wavelength selective optical switching equipment can be used to avoid having to provide dedicated point-to-point links between each remote master unit 104 and each local master unit 105. Instead, a wavelength selective switch can be used to implement a network topology that provides the same desired transport bandwidth and dynamic routing capabilities using much less optical fiber.

For example, each remote master unit 104 and local master unit 105 can be connected to a wavelength selective switch using a single optical fiber over which all optical signals (having various optical wavelengths) are sent and received from that remote or local master unit 104 or 105. In other examples, each remote master unit 104 and local master unit 105 can be connected to a wavelength selective optical switch using multiple optical fibers. In one such example, each remote master unit 104 and local master unit 105 can be connected to the wavelength selective optical switch using two optical fibers, one of which is used for communicating uplink transport signals and the other of which is used for communicating downlink transport signals. In such an example, two wave-division multiplexors are coupled to each remote or local master unit 104 and 105, one of which is used for multiplexing transport signals transmitted from all of the transport media interfaces 110 or 114 and the other of which is used for demultiplexing transport signals for reception by all of the transport media interfaces 110 or 114.

The wavelength selective switch is configured to selectively output any of the multiple optical signals it receives from any fiber on any of the other fibers connected to it. In this way, the wavelength selective switch is able to output any of the multiple optical signals it receives from any of the remote master units 104 to any of the local master units 105 and to selectively output any of the multiple optical signals it receives from any of the local master units 105 to any of the remote master units 104. The wavelength selective optical switch can do this under the control of a system controller. In this way, the base-station capacity provided by the various base-station locations can be distributed among the various different DAS coverage areas.

As noted above, each transport media interface 110 and 114 of the remote master units 104 and the local master units 105 is configured to modulate transmitted digital data onto an optical carrier having a selected optical wavelength and to demodulate received digital data that was modulated onto an optical carrier having a selected optical wavelength. Each such transport media interface 110 and 114 can comprise a small form-factor pluggable (SPF) optical transceiver (for example, a tunable SFP+ optical module). In examples where wavelength-division multiplexing is used, each transport media interface 110 and 114 is configured so that any output optical signal transmitted by that interface 110 and 114 has an optical wavelength that differs from the optical wavelength of any other optical signal communicated over any optical fiber that the optical signal traverses. Moreover, wavelengths may be reused in the system as long as signals having the same wavelength do not traverse the same fiber at the same time.

Also, in the example shown below in connection with FIGS. 7-12, only a single a wave-division multiplexor is coupled to each remote or local master unit 104 and 105 in order to multiplex and demultiplex transport signals for all of the transport media interfaces 110 or 114. However, if additional transport capacity or routing flexibility is needed, multiple wave-division multiplexors can be coupled to each remote or local master unit 104 and 105, where each of wave-division multiplexor can be used to multiplex and demultiplex transports signals for a respective subset of the transport media interfaces 110 or 114.

There are many ways to implement an optical network for use in a DAS and the elements of the optical network and switching/multiplexing equipment may be realized in many ways using different types of optical devices and may be comprised of multiple devices at multiple locations rather than the single devices. The wavelength selective elements can be fixed-wavelength elements or they can be variable-wavelength elements. The optical network can be configured using any of various network topologies (such as a ring, a star, a mesh, a bus, a hybrid configuration, etc.) that provides connectivity between the remote master units 104 and the local master units 105. In addition, certain parts of the network, in some embodiments, may use switching elements that are not wavelength selective.

Figure 7:
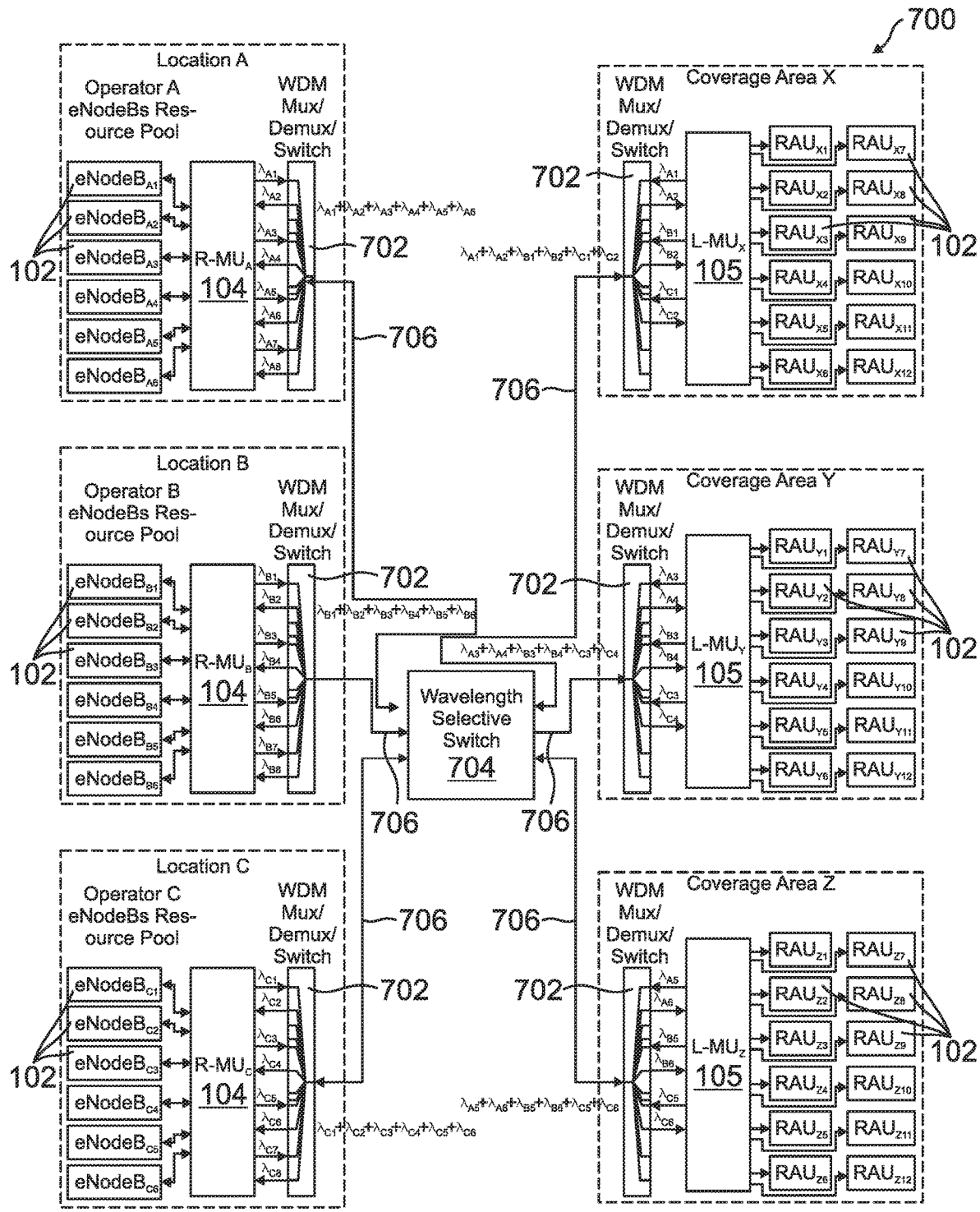
FIG. 7 is an illustration of a wave division multiplexing wide area distributed antenna system implementing a wavelength selective switch according to one exemplary embodiment.

In the example shown in FIG. 7, a DAS 700 having a M2M DMU configuration is used to enable three wireless operators to distribute base-station capacity among three different DAS coverage areas. In general, the example shown in FIG. 7 is implemented in the same manner as the DAS 600 described above in connection with FIGS. 6A-6C, except for how the communication links between the various remote master units 104 and local master units 105 are implemented. The description of those features of DAS 700 that are the same as the corresponding features of DAS 600 is not repeated here for the sake brevity.

In the example shown in FIG. 7, a wavelength-division multiplexor 702 is deployed with each remote master unit 104 and each local master unit 105. Each remote master unit 104 and local master unit 105 is connected to a wavelength selective switch 704 using a single optical fiber 706 over which all optical signals (having various optical wavelengths) sent and received from the transport media interfaces 110 and 114 (not shown in FIG. 7) of that remote or local master unit 104 or 105 are communicated. The wavelength selective switch 704 is configured to selectively output any of the multiple optical signals it receives from any fiber 706 to any of the other fibers 706 connected to it. In this way, the wavelength selective switch 704 is able to output any of the multiple optical signals it receives from any of the remote master units 104 to any of the local master units 105 and to selectively output any of the multiple optical signals it receives from any of the local master units 105 to any of the remote master units 104.

In the example shown in FIG. 7, the wavelength selective switch 704 is configured to route the base-station capacity among the coverage areas in the same manner as described above in connection with FIG. 6B.

That is, the capacity of two base stations 102 from each wireless operator at each base station location is provided to each of the coverage locations.

In this example, the first transport media interface 110 of the remote master unit 104 at each base-station location A, B, and C transmits downlink transport signals including digital transport data for the first and second base stations 102 at the respective base-station location A, B, and C on a respective optical wavelength $\lambda_{A1}$, $\lambda_{B1}$, and $\lambda_{C1}$ and receives transport signals including digital transport data for the first and second base stations 102 at the respective base-station location A, B, and C on a respective optical wavelength $\lambda_{A2}$, $\lambda_{B2}$, and $\lambda_{C2}$.

The second transport media interface 110 of the remote master unit 104 at each base-station location A, B, and C transmits downlink transport signals including digital transport data for the third and fourth base stations 102 at the respective base-station location A, B, and C on a respective optical wavelength $\lambda_{A3}$, $\lambda_{B3}$, and $\lambda_{C3}$ and receives transport signals including digital transport data for the third and fourth base stations 102 at the respective base-station location A, B, and C on a respective optical wavelength $\lambda_{A4}$, $\lambda_{B4}$, and $\lambda_{C4}$.

The third transport media interface 110 of the remote master unit 104 at each base-station location A, B, and C transmits downlink transport signals including digital transport data for the fifth and sixth base stations 102 at the respective base-station location A, B, and C on a respective optical wavelength $\lambda_{A5}$, $\lambda_{B5}$, and $\lambda_{C5}$ and receives transport signals including digital transport data for the fifth and sixth base stations 102 at the respective base-station location A, B, and C on a respective optical wavelength $\lambda_{A6}$, $\lambda_{B6}$, and $\lambda_{C6}$.

For the local master unit 105 at coverage location X, each of the first three transport media interfaces 114 receives downlink transport signals including digital transport data for the first and second base stations 102 from the respective base-station location A, B, and C on the respective optical wavelength $\lambda_{A1}$, $\lambda_{B1}$, and $\lambda_{C1}$ and transmits transport signals including digital transport data for the first and second base stations 102 at the respective base-station location A, B, and C on the respective optical wavelength $\lambda_{A2}$, $\lambda_{B2}$, and $\lambda_{C2}$.

For the local master unit 105 at coverage location Y, each of the first three transport media interfaces 114 receives downlink transport signals including digital transport data for the third and fourth base stations 102 from the respective base-station location A, B, and C on the respective optical wavelength $\lambda_{A3}$, $\lambda_{B3}$, and $\lambda_{C3}$ and transmits transport signals including digital transport data for the third and fourth base stations 102 at the respective base-station location A, B, and C on the respective optical wavelength $\lambda_{A4}$, $\lambda_{B4}$, and $\lambda_{C4}$.

For the local master unit 105 at coverage location Z, each of the first three transport media interfaces 114 receives downlink transport signals including digital transport data for the fifth and sixth base stations 102 from the respective base-station location A, B, and C on the respective optical wavelength $\lambda_{A5}$, $\lambda_{B5}$, and $\lambda_{C5}$ and transmits transport signals including digital transport data for the fifth and sixth base stations 102 at the respective base-station location A, B, and C on the respective optical wavelength $\lambda_{A6}$, $\lambda_{B6}$, and $\lambda_{C6}$.

The wave-division multiplexor 702 at each base-station location A, B, and C wavelength multiplexes and demultiplexes the six optical wavelengths transmitted and received by the first three transport media interfaces 110 at the respective remote master unit 104 for communication over the respective fiber 706 that connects that wavelength division multiplexer 702 to the wavelength selective switch 704. Similarly, the wave-division multiplexor 702 at each coverage location X, Y, and Z wavelength multiplexes and demultiplexes the six optical wavelengths transmitted and received by the first three transport media interfaces 114 at the respective local master unit 105 for communication over the respective fiber 706 that connects that wavelength division multiplexer 702 to the wavelength selective switch 704.

The wavelength selective switch 704 is configured so that the desired optical wavelengths received on any fiber 706 are each output on an appropriate one or more of the other fiber 706. More specifically, the wavelength selective switch 704 is configured in this example so that each of the optical wavelengths $\lambda_{A1}$, $\lambda_{A3}$, and $\lambda_{A5}$ received on the fiber 706 connected to the wavelength division multiplexer 702 at base-station location A is output on the respective fiber connected to the respective wave-divisional multiplexer 702 at each of coverage locations X, Y, and Z, so that each of the optical wavelengths $\lambda_{B1}$, $\lambda_{B3}$, and $\lambda_{B5}$ received on the fiber 706 connected to the wavelength division multiplexer 702 at base-station location B is output on the respective fiber connected to the respective wave-divisional multiplexer 702 at each of coverage locations X, Y, and Z, and so that each of the optical wavelengths $\lambda_{C1}$, $\lambda_{C3}$, and $\lambda_{C5}$ received on the fiber 706 connected to the wavelength division multiplexer 702 at base-station location C is output on the respective fiber connected to the respective wave-divisional multiplexer 702 at each of coverage locations X, Y, and Z.

Similarly, the wavelength selective switch 704 is configured in this example so that each of the optical wavelengths $\lambda_{A2}$, $\times_{B2}$, and $\lambda_{C2}$ received on the fiber 706 connected to the wavelength division multiplexer 702 at coverage location X is output on the respective fiber connected to the respective wave-divisional multiplexer 702 at each of the base-station locations A, B, and C, so that each of the optical wavelengths $\lambda_{A4}$, $\lambda_{B4}$, and $\lambda_{C4}$ received on the fiber 706 connected to the wavelength division multiplexer 702 at coverage location Y is output on the respective fiber connected to the respective wave-divisional multiplexer 702 at each of the base-station locations A, B, and C, and so that each of the optical wavelengths $\lambda_{A6}$, $\lambda_{B6}$, and $\lambda_{C6}$ received on the fiber 706 connected to the wavelength division multiplexer 702 at coverage location Z is output on the respective fiber connected to the respective wave-divisional multiplexer 702 at each of the base-station locations A, B, and C.

Figure 8:
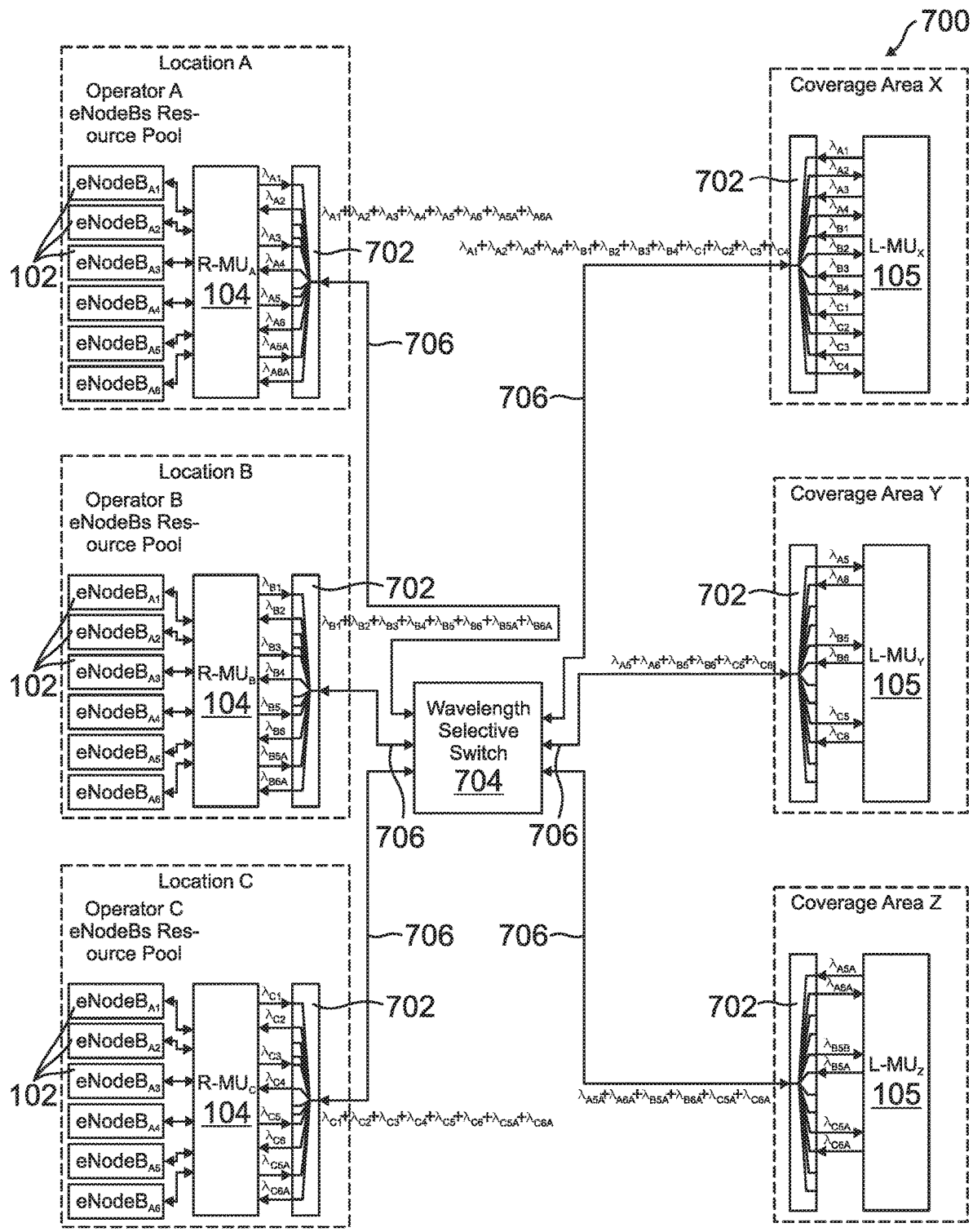
FIG. 8 is an illustration of a wave division multiplexing wide area distributed antenna system implementing a wavelength selective switch according to another exemplary embodiment.

FIG. 8 shows the DAS 700 of FIG. 7 with the wavelength selective switch 704 configured to route the base-station capacity among the coverage areas in the same manner as described above in connection with FIG. 6C.

That is, the capacity of four base stations 102 from each wireless operator at each base-station location is provided to the first coverage location X, and the capacity of one base station 102 from each wireless operator at each base-station location is provided to the other two coverage locations Y and Z.

In this example, the first transport media interface 110 of the remote master unit 104 at each base-station location A, B, and C transmits downlink transport signals including digital transport data for the first and second base stations 102 at the respective base-station location A, B, and C on a respective optical wavelength $\lambda_{A1}$, $\lambda_{B1}$, and $\lambda_{C1}$ and receives transport signals including digital transport data for the first and second base stations 102 at the respective base-station location A, B, and C on a respective optical wavelength $\lambda_{A2}$, $\lambda_{B2}$, and $\lambda_{C2}$.

The second transport media interface 110 of the remote master unit 104 at each base-station location A, B, and C transmits downlink transport signals including digital transport data for the third and fourth base stations 102 at the respective base-station location A, B, and C on a respective optical wavelength $\lambda_{A3}$, $\lambda_{B3}$, and $\lambda_{C3}$ and receives transport signals including digital transport data for the third and fourth base stations 102 at the respective base-station location A, B, and C on a respective optical wavelength $\lambda_{A4}$, $\lambda_{B4}$, and $\lambda_{C4}$.

The third transport media interface 110 of the remote master unit 104 at each base-station location A, B, and C transmits downlink transport signals including digital transport data for the fifth base station 102 at the respective base-station location A, B, and C on a respective optical wavelength $\lambda_{A5}$, $\lambda_{B5}$, and $\lambda_{C5}$ and receives transport signals including digital transport data for the fifth base station 102 at the respective base-station location A, B, and C on a respective optical wavelength $\lambda_{A6}$, $\lambda_{B6}$, and $\lambda_{C6}$.

The fourth transport media interface 110 of the remote master unit 104 at each base-station location A, B, and C transmits downlink transport signals including digital transport data for the sixth base station 102 at the respective base-station location A, B, and C on a respective optical wavelength $\lambda_{A7}$, $\lambda_{B7}$, and $\lambda_{C7}$ and receives transport signals including digital transport data for the sixth base station 102 at the respective base-station location A, B, and C on a respective optical wavelength $\lambda_{A8}$, $\lambda_{B8}$, and $\lambda_{C8}$.

For the local master unit 105 at coverage location X, each of the first and second transport media interfaces 114 receives downlink transport signals including digital transport data for each of the first two pairs of base stations 102 from base-station location A on the respective optical wavelengths $\lambda_{A1}$ and $\lambda_{A3}$ and transmits transport signals including digital transport data for each of the first two pairs of base stations 102 at the base-station location A on the respective optical wavelength $\lambda_{A2}$ and $\lambda_{A4}$. For the local master unit 105 at coverage location X, each of the third and fourth transport media interfaces 114 receives downlink transport signals including digital transport data for each of the first two pairs of base stations 102 from base-station location B on the respective optical wavelengths $\lambda_{B1}$ and $\lambda_{B3}$ and transmits transport signals including digital transport data for each of the first two pairs of base stations 102 at the base-station location B on the respective optical wavelength $\lambda_{B2}$ and $\lambda_{B4}$. For the local master unit 105 at coverage location X, each of the fifth and sixth transport media interfaces 114 receives downlink transport signals including digital transport data for each of the first two pairs of base stations 102 from base-station location C on the respective optical wavelengths $\lambda_{C1}$ and $\lambda_{C3}$ and transmits transport signals including digital transport data for each of the first two pairs of base stations 102 at the base-station location C on the respective optical wavelength $\lambda_{C2}$ and $\lambda_{C4}$.

For the local master unit 105 at coverage location Y, each of the first three transport media interfaces 114 receives downlink transport signals including digital transport data for the fifth base station 102 from the respective base-station location A, B, and C on the respective optical wavelength $\lambda_{A5}$, $\lambda_{B5}$, and $\times_{C5}$ and transmits transport signals including digital transport data for the fifth base stations 102 at the respective base-station location A, B, and C on the respective optical wavelength $\lambda_{A6}$, $\lambda_{B6}$, and $\lambda_{C6}$.

For the local master unit 105 at coverage location Z, each of the first three transport media interfaces 114 receives downlink transport signals including digital transport data for the sixth base station 102 from the respective base-station location A, B, and C on the respective optical wavelength $\lambda_{A7}$, $\lambda_{B7}$, and $\lambda_{C7}$ and transmits transport signals including digital transport data for the sixth base station 102 at the respective base-station location A, B, and C on the respective optical wavelength $\lambda_{A8}$, $\lambda_{B8}$, and $\lambda_{C8}$.

The wave-division multiplexor 702 at each base-station location A, B, and C wavelength multiplexes and demultiplexes the eight optical wavelengths transmitted and received by the first four transport media interfaces 110 at the respective remote master unit 104 for communication over the respective fiber 706 that connects that wavelength division multiplexer 702 to the wavelength selective switch 704.

The wave-division multiplexor 702 at coverage location X wavelength multiplexes and demultiplexes the twelve optical wavelengths transmitted and received by the six transport media interfaces 114 at the respective local master unit 105 for communication over the fiber 706 that connects that wavelength division multiplexer 702 to the wavelength selective switch 704. The wave-division multiplexor 702 at each of the other two coverage location Y and Z wavelength multiplexes and demultiplexes the six optical wavelengths transmitted and received by the first three transport media interfaces 114 at the respective local master unit 105 for communication over the respective fiber 706 that connects that wavelength division multiplexer 702 to the wavelength selective switch 704.

The wavelength selective switch 704 is configured so that the desired optical wavelengths received on any fiber 706 are each output on an appropriate one or more of the other fiber 706. More specifically, the wavelength selective switch 704 is configured in this example so that the optical wavelengths $\lambda_{A1}$ and $\lambda_{A3}$ received on the fiber 706 connected to the wavelength division multiplexer 702 at base-station location A is output on the fiber connected to the wave-divisional multiplexer 702 at coverage location X and so that each of the optical wavelengths $\lambda_{A5}$ and $\lambda_{A7}$ received on the fiber 706 connected to the wavelength division multiplexer 702 at base-station location A is output on the respective fiber connected to the respective wave-divisional multiplexer 702 at each of coverage locations Y and Z.

The wavelength selective switch 704 is configured in this example so that the optical wavelengths $\lambda_{B1}$ and $\lambda_{B3}$ received on the fiber 706 connected to the wavelength division multiplexer 702 at base-station location B is output on the fiber connected to the wave-divisional multiplexer 702 at coverage location X and so that each of the optical wavelengths $\lambda_{B5}$ and $\lambda_{B7}$ received on the fiber 706 connected to the wavelength division multiplexer 702 at base-station location B is output on the respective fiber connected to the respective wave-divisional multiplexer 702 at each of coverage locations Y and Z.

The wavelength selective switch 704 is configured in this example so that the optical wavelengths $\lambda_{C1}$ and $\lambda_{C3}$ received on the fiber 706 connected to the wavelength division multiplexer 702 at base-station location C is output on the fiber connected to the wave-divisional multiplexer 702 at coverage location X and so that each of the optical wavelengths $\lambda_{C5}$ and $\lambda_{C7}$ received on the fiber 706 connected to the wavelength division multiplexer 702 at base-station location C is output on the respective fiber connected to the respective wave-divisional multiplexer 702 at each of coverage locations Y and Z.

Similarly, the wavelength selective switch 704 is configured in this example so that the optical wavelengths $\lambda_{A2}$ and $\lambda_{A4}$ received on the fiber 706 connected to the wavelength division multiplexer 702 at coverage location X is output on the respective fiber connected to the wave-divisional multiplexer 702 at base-station location A, so that the optical wavelengths $\lambda_{B2}$ and $\lambda_{B4}$ received on the fiber 706 connected to the wavelength division multiplexer 702 at coverage location X is output on the respective fiber connected to the wave-divisional multiplexer 702 at base-station location B, and so that the optical wavelengths $\lambda_{C2}$ and $\lambda_{C4}$ received on the fiber 706 connected to the wavelength division multi-plexer 702 at coverage location X is output on the respective fiber connected to the wave-divisional multiplexer 702 at base-station location C.

Also, the wavelength selective switch 704 is configured in this example so that each of the optical wavelengths $\lambda_{B6}$ and $\lambda_{C6}$ received on the fiber 706 connected to the wavelength division multiplexer 702 at coverage location Y is output on the respective fiber connected to the respective wave-divisional multiplexer 702 at each of the base-station locations B and C and so that each of the optical wavelengths $\lambda_{B8}$ and $\lambda_{C8}$ received on the fiber 706 connected to the wavelength division multiplexer 702 at coverage location Z is output on the respective fiber connected to the respective wave-divisional multiplexer 702 at each of the base-station locations B and C.

One of the benefits to the use of the configuration shown in FIGS. 7-8 is that the multiplexing, demultiplexing, and routing of base-station capacity occurs optically and does not introduce any additional electrical multiplexing, demultiplexing, or routing. Such additional electrical multiplexing, demultiplexing, or routing would require additional processing and introduce additional delay or latency. Also, this configuration is easily expandable by communicating additional optical wavelengths over the various fibers. Dense wavelength-division multiplexers (DWDMs) can be used to multiplex and demultiplex more than 100 optical wavelengths. Thus, more than 100 optical wavelengths can be used on each fiber before an additional fiber would be needed.

Figure 9:
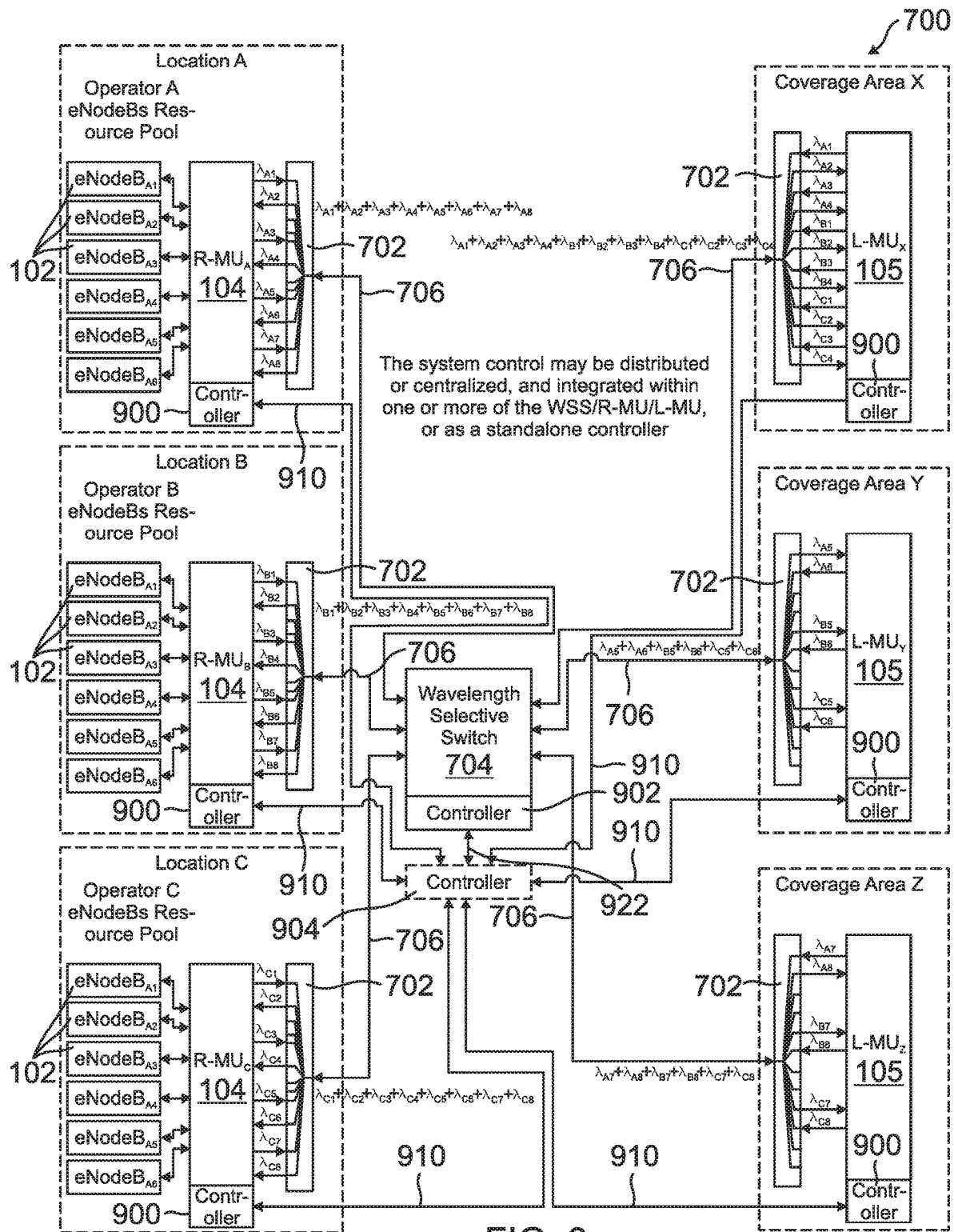
FIG. 9 is an illustration of a wave division multiplexing wide area distributed antenna system implementing a wavelength selective switch and controllers according to another exemplary embodiment.

The distributed master unit functionality described here can be controlled in various ways. FIG. 9 explicitly illustrates the controller functionality that is included in the DAS 700 described above in connection with FIGS. 7-8.

As shown in FIG. 9, each of the remote and local master units 104 and 105 includes a respective controller 900 that is used for controlling the operation of that master unit 104 or 105. Also, the wavelength selective switch 704 includes a controller 902 that is used for controlling the operation of the wavelength selective switch 704. An external overall system controller 904 is used to control the overall DAS 700. Examples of things that can be controlled are the particular wavelengths transmitted and received by the various interfaces in the remote and local master units 104 and 105 and the optical switching performed in the wavelength selective switch 704.

The DAS 700 is configured so that the various controllers 900, 902, and 904 are able to communicate with each other. Such control communications can occur in-band using the communication links 706 that are used for transporting base-station capacity, out-of-band using communication links 910 that are not used for transporting base-station capacity, or combinations thereof.

In general, each of the controllers 900, 902, and 904 can be implemented using one or more of a microprocessor, a digital signal processor (DSP), an application specific integrated circuit (ASIC), a field program gate array (FPGA), or equivalent discrete or integrated logic circuitry. In some example embodiments, each of the controllers 900, 902, and 904 may include multiple components, such as any combination of one or more microprocessors, one or more controllers, one or more DSPs, one or more ASICs, one or more FPGAs, as well as other discrete or integrated logic circuitry. The functions attributed to each of the controllers 900, 902, and 904 herein may be implemented as software, firmware, hardware, or combinations thereof. To the extent that such functions are implemented, at least in part, as software or firmware, the software or firmware can comprise program instructions that are stored (or otherwise embodied) on an appropriate non-transitory storage medium or media from which at least a portion of the program instructions are read by one or more programmable processors for execution thereby. The software or firmware is configured to cause the relevant one or more processors to carry out at least some of the operations described here as being performed by that controller. The storage medium can be included in the controller itself or the device in which the controller is included. Remote storage media (for example, storage media that is accessible over a network) and/or removable media can also be used. Each controller includes or is coupled to appropriate memory for storing the program instructions and any related data during execution of the software or firmware.

As noted above, the distributed master unit functionality can be controlled in various ways. The system controller 904 can serve as a master (or central) controller that controls the operation of the remote and local master units 104 and 105 and the wavelength selective switch 704 by interacting with the respective controllers 900 and 902. Also, one of the controllers 900 and 902 can also serve as the master (or central) controller. Moreover, a distributed control scheme can be used.

The DAS 700 uses an optical wavelength selective switch 704 to dynamically and selectively route signals among the various remote and local master units 104 and 105. If this function where instead performed by an electrical switching element, optical-to-electrical and electrical-to-optical conversions would need to be performed as a part of that switching. By instead using an optical wavelength selective switch 704, such optical-to-electrical and electrical-to-optical conversions can be avoided, thereby avoiding the complexity, delay, and latency associated with doing so.

Also, avoiding such optical-to-electrical and electrical-to-optical conversions can make clock transparency and reference clock distribution easier. It is generally desirable for the remote and local master units 104 and 105 to use a common reference clock, thereby avoiding the need to accommodate clock differences.

Generally, in distributed systems, a reference clock signal is communicated from a master device to various slave devices. The reference clock signal can be distributed in various ways.

One approach to distributing a reference clock signal is to use a clock signal generated at the master device as the reference clock signal and to clock signals transmitted from the master device using the reference clock signal and then have the receiving devices recover the reference clock signal from the received signals. The receiving devices in turn use the recovered reference clock signal to clock signals transmitted from the receiving devices so that the additional devices receiving those signals can themselves recover the reference clock signal from the received signals.

For example, the local master unit 105 in coverage area X can be designated as the clock master and generate the clock signal that is used as the reference clock signal. The uplink signals transmitted from that local master unit 105 to the remote master units 104 at base-station locations A, B, and C are clocked using the reference clock signal. The remote master units 104 at base-station locations A, B, and C recover the reference clock signal from the signals transmitted from the master local master unit 105 and in turn use the recovered reference clock signal to clock signals transmitted from those remote master units 104. The other local master units 105 at coverage locations Y and Z recover the reference clock signal from the signals transmitted from the various remote master units 104 and in turn use the recovered reference clock signal to clock signals transmitted from those local master units 105. In this way, the reference clock signal can be distributed throughout the system.

Another approach to distributing a reference clock signal is to use an optical carrier transmitted from a master device as the reference clock signal. For example, the local master unit 105 at coverage area X can be designated as the clock master. In this example, that local master unit 105 is configured to use one of the optical carries used for transmitting uplink transport signals as the reference clock signal (for example, the optical carrier having the optical wavelength $\lambda_{A2}$). That reference optical carrier is transmitted over the fiber 706 that connects that local master unit 105 to the wavelength selective switch 704. The wavelength selective switch 704 can then provide the reference optical carrier to the other remote and local master units 104 and 105, which use the reference optical carrier to recover the reference clock signal.

Figure 10:
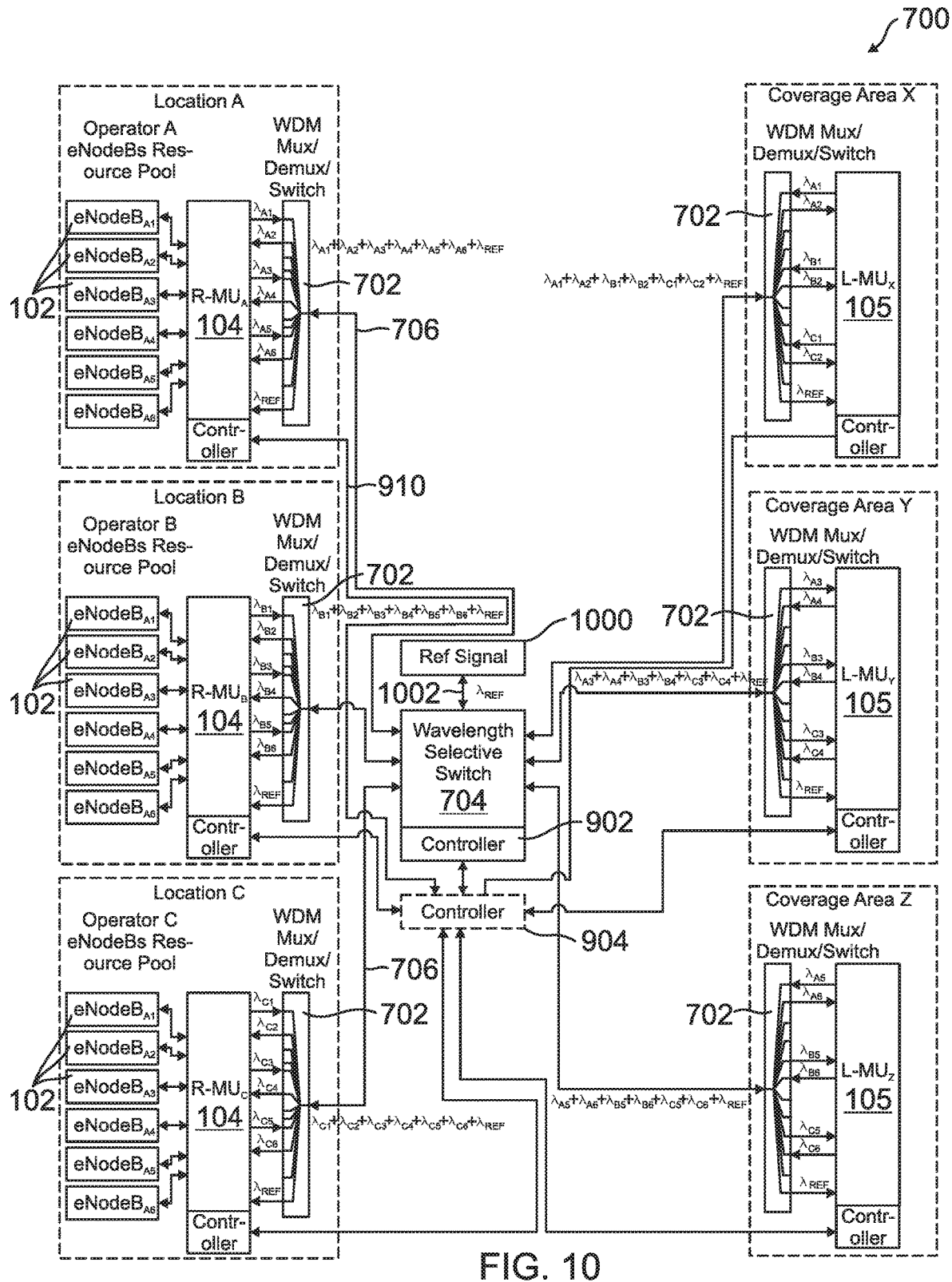
FIG. 10 is an illustration of a wave division multiplexing wide area distributed antenna system using a system reference clock for reference clock distribution according to another exemplary embodiment.

Yet another approach to distributing a reference clock signal involves generating a signal that is solely used for distributing the reference clock signal. One example of this approach is shown in FIG. 10. FIG. 10 shows the DAS 700 of FIG. 7 with a reference signal generator 1000 coupled to the wavelength selective switch 704 via an optical fiber 1002. The reference signal generator 1000 is used to generate the reference clock signal, which it uses to generate an optical signal having a unique wavelength $\lambda_{REF}$. This reference optical signal is then communicated to the wavelength selective switch 704, which in turn forwards the reference optical signal to all of the remote and local master units 104 and 105. The reference clock signal is then recovered from the reference optical signal $\lambda_{REF}$.

As discussed above, a reference clock can be distributed on the same wavelength-division multiplexed optical network that carries the other DAS signals. The examples described above are not exhaustive. Other approaches to distributing a reference clock can be used.

Moreover, the particular approach used for distributing the reference clock, and/or which device is selected as the clock master, can be configured locally or remotely. For instance, the system controller 904 can be used to select one device as the clock master for the DAS and configure the other devices to use a reference clock signal originating from that selected clock master.

The distributed antenna systems described above can be easily reconfigured to adapt to changes in the number of users at the different coverage locations. These distributed antenna systems enable base station resources to be used more efficiently in coverage locations where the number of users changes significantly. The distributed antenna systems can also be used to significantly reduce the number of fibers that are used to interconnect the remote and local master units 104 and 105, many of which might be separated by large distances. The distributed antenna systems can also be configured to be easily upgraded. For instance, if an additional base station is installed at a base-station location and there is not sufficient transport bandwidth available to transport the capacity provided from that base station, then an additional transport media interface 110 can be used to communicate the associated transport signals using one or more additional optical wavelengths over the existing fiber cabling, which enables additional transport bandwidth to be provided without increasing the number of fibers used.

Figure 11:
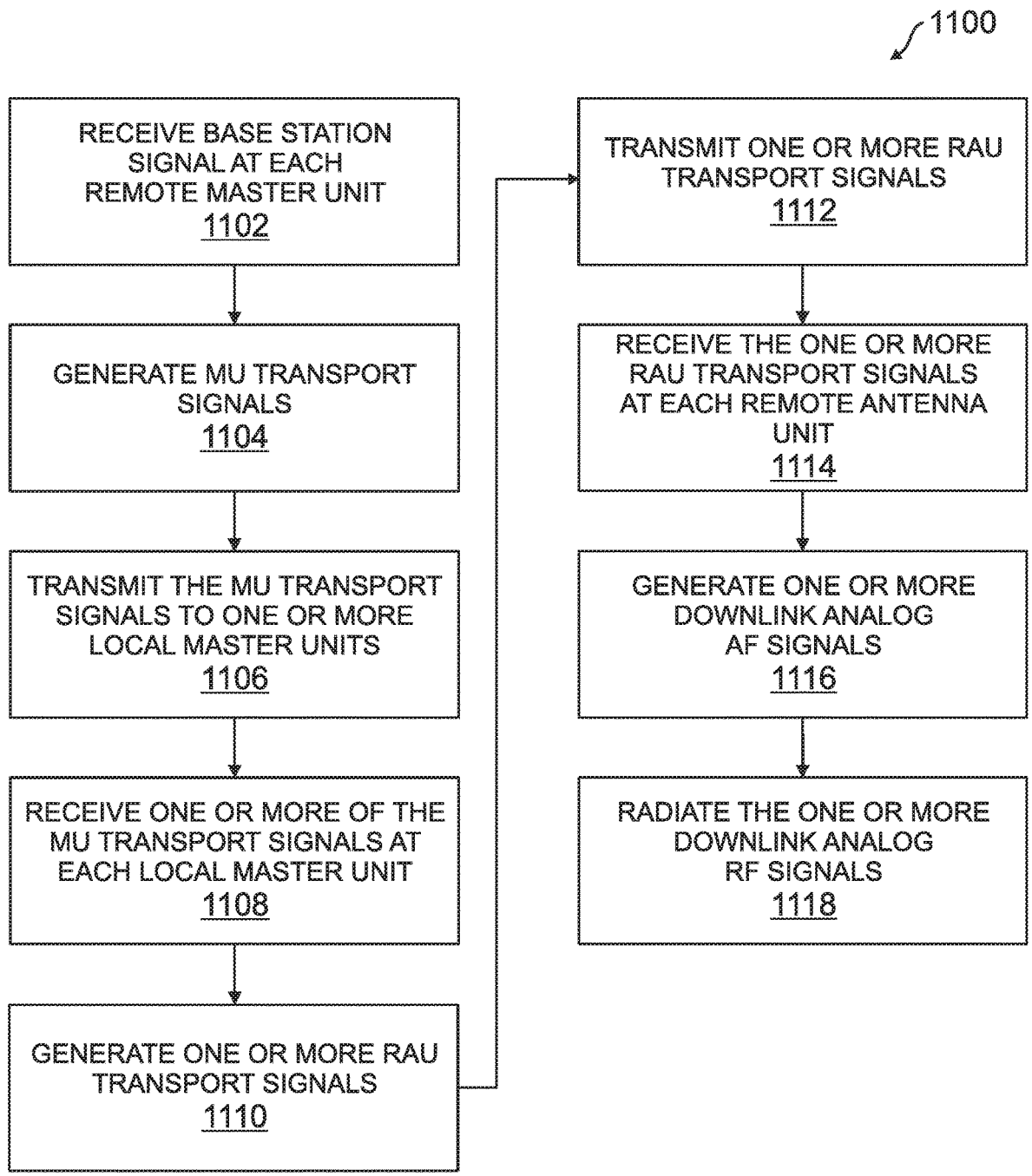
FIG. 11 is a flow diagram illustrating an exemplary embodiment of a method of transporting downlink signals in a distributed antenna system.

FIG. 11 is a flow diagram illustrating an exemplary embodiment of a method 1100 of transporting downlink signals in a distributed antenna system. The embodiment of method 1100 shown in FIG. 11 can be implemented in any of the various distributed antenna systems described above, though it is to be understood that other embodiments can be implemented in other ways. Also, the reference clock used for the processing associated with method 1100 can be distributed as described above.

The blocks of the flow diagram shown in FIG. 11 have been arranged in a generally sequential manner for ease of explanation; however, it is to be understood that this arrangement is merely exemplary, and it should be recognized that the processing associated with method 1100 (and the blocks shown in FIG. 11) can occur in a different order (for example, where at least some of the processing associated with the blocks is performed in parallel and/or in an event-driven manner). Also, most standard exception handling is not described for ease of explanation; however, it is to be understood that method 1100 can and typically would include such exception handling.

Method 1100 comprises receiving, at each remote master unit, base-station signals from one or more base stations (block 1102). As noted above, the base-station signals can comprise analog radio frequency signals or signals including digital baseband data formatted according to a standard base-station baseband protocol such as CPRI.

Method 1100 further comprises generating, at each remote master unit, one or more L-MU transport signals (or MU transport signals) from the various base-station signals (block 1104) and transmitting the one or more L-MU transport signals to one or more local master units (block 1106). As discussed above, this can be done by converting the downlink base station signals to digital transport data compatible with the format used in the DAS. For example, where the base station signals comprise analog downlink radio frequency signals, an ADC/DAC interface in the remote master unit can be used to convert downlink analog radio frequency signals received from a respective base station to downlink transport data.

Where the base station signals comprise digital baseband data formatted according to a standard base-station baseband protocol, a digital baseband interface in the remote master unit can be used to convert the received digital baseband data to digital data compatible with the format used in the DAS. A switch function included each remote master unit can be used, for each L-MU transport media interface in the remote master unit, to multiplex (combine) downlink transport data from one or more of the ADC/DAC interfaces and/or baseband interfaces and provide the multiplexed transport data to that L-MU transport media interface, which generates a L-MU transport signal including the multiplexed data. The L-MU transport media interface transmits the L-MU transport signal over a respective communication link coupled to that transport media interface. The L-MU transport signals can be communicated as optical signals.

Each optical L-MU transport signal can be communicated over a point-to-point optical fiber from a remote master unit to a local master unit. In one such example, each such point-to-point optical fiber is used for communicating only a single optical signal in one direction. In another example, each such point-to-point optical fiber is used for communicating two optical signals, for one in each direction. In such an example, wave-division multiplexors can be coupled to the optical fiber for wave-division multiplexing the two signals. In yet another embodiment, a wavelength selective switch can be used as shown above in connection with FIGS. 7-8.

Method 1100 further comprises receiving, at each local master unit, one or more L-MU transport signals from one or more remote master units (block 1108), generating, at each local master unit, one or more RAU transport signals from the various L-MU transport signals received from the remote master units (block 1110), and transmitting the one or more RAU transport signals to one or more remote antenna units (block 1112). For example, the various R-MU transport media interfaces included in each local master unit can receive the L-MU transport signals communicated to it. A local switch function in each local master unit can, for each received L-MU transport signal, demultiplex (separate out) the multiplexed downlink transport data associated with the various base stations. The local switch function in each local master unit can, for each RAU transport media interface, multiplex (combine) downlink transport data from one or more of the base stations communicated via any of the various L-MU transport signals and provide the multiplexed transport data to that RAU transport media interface, which generates a RAU transport signal that includes the multiplexed transport data. Each RAU transport media interface in the local master unit can communicate the respective transport signal to one or more remote antenna units.

Method 1100 further comprises receiving, at each remote antenna unit, one or more RAU transport signals from one or more local master units (block 1114), generating, at each remote antenna unit, one or more downlink analog radio frequency signals from the one or more RAU transport signals received from one or more local master units (block 1116), and radiating, from one or more antennas associated with each remote antenna unit, the one or more downlink analog radio frequency signals (block 1118). Each remote antenna unit can receive the downlink RAU transport signals communicated to it over a respective communication link, demultiplex (separate out) the multiplexed downlink transport data for various base stations communicated via the received downlink RAU transport signals and generate respective corresponding downlink analog radio frequency signals from the downlink transport data. The generated downlink analog radio frequency signals can then be combined, power amplified, and radiated from one or more antennas included in, coupled to, or otherwise associated with that remote antenna unit. The downlink analog radio frequency signals are radiated for reception by user equipment.

Figure 12:
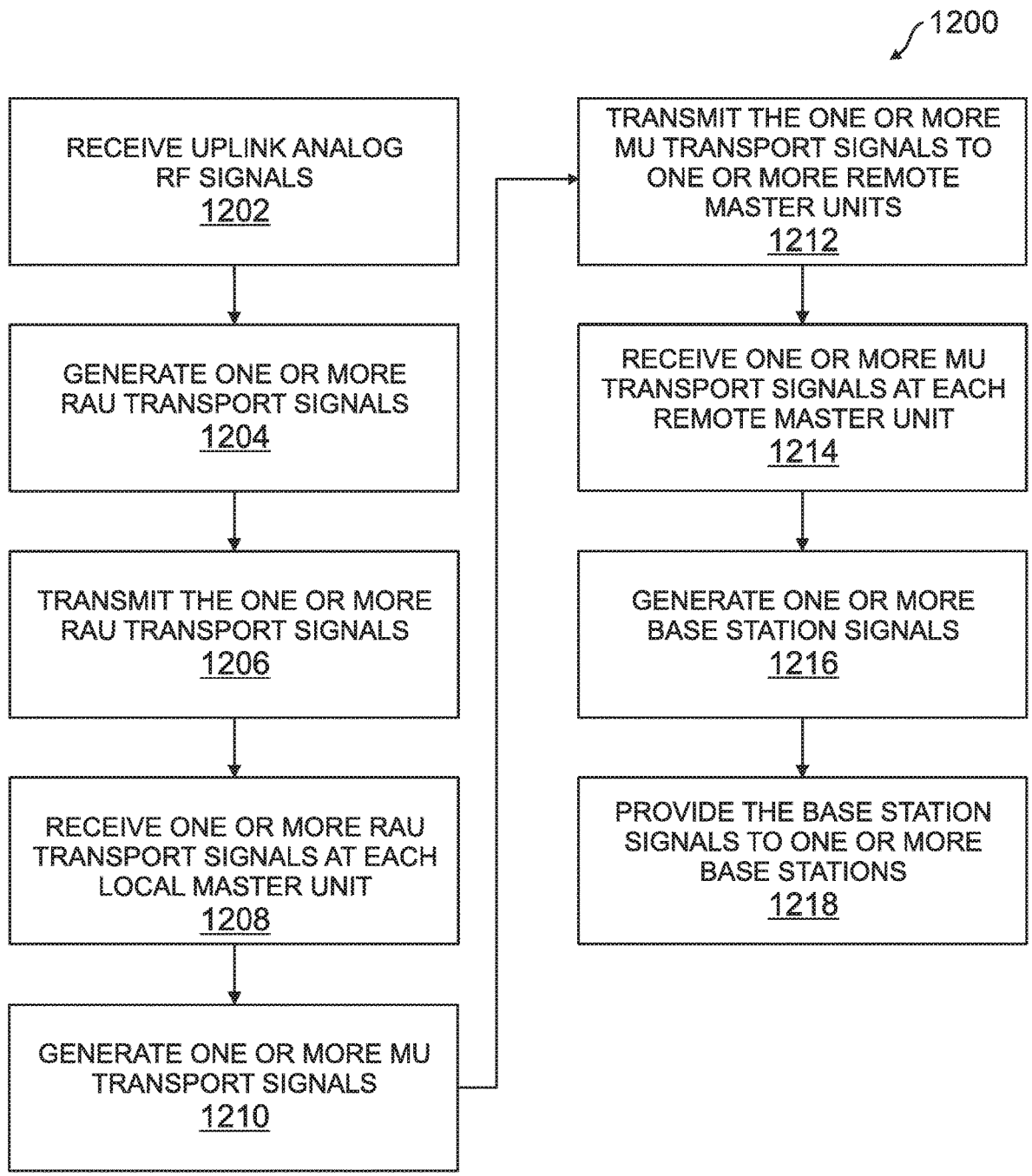
FIG. 12 is a flow diagram illustrating an exemplary embodiment of a method 1200 of transporting uplink signals in a distributed antenna system.

FIG. 12 is a flow diagram illustrating an exemplary embodiment of a method 1200 of transporting uplink signals in a distributed antenna system. The embodiment of method 1200 shown in FIG. 12 can be implemented in any of the various distributed antenna systems described above, though it is to be understood that other embodiments can be implemented in other ways. Also, the reference clock used for the processing associated with method 1200 can be distributed as described above.

The blocks of the flow diagram shown in FIG. 12 have been arranged in a generally sequential manner for ease of explanation; however, it is to be understood that this arrangement is merely exemplary, and it should be recognized that the processing associated with method 1200 (and the blocks shown in FIG. 12) can occur in a different order (for example, where at least some of the processing associated with the blocks is performed in parallel and/or in an event-driven manner). Also, most standard exception handling is not described for ease of explanation; however, it is to be understood that method 1200 can and typically would include such exception handling.

Method 1200 comprises receiving, at each remote antenna unit via one or more antennas associated with the unit, uplink analog radio frequency signals transmitted from user equipment (block 1202). Each of the uplink analog radio frequency signals is transmitted for reception by one of the base stations coupled to the DAS. At each remote antenna unit, the analog uplink radio frequency signals are received via the one or more antennas that are included in, coupled to, or otherwise associated with that remote antenna unit.

Method 1200 further comprises generating, at each remote antenna unit, one or more uplink RAU transport signals from the various uplink analog radio frequency signals (block 1204) and transmitting the one or more RAU transport signals to one or more local master units (block 1206). Each received analog uplink radio frequency signal can be converted into uplink transport data. The uplink transport data for the various received uplink analog radio frequency signals can be multiplexed together and provided to a transport media interface included in each remote antenna unit. The transport media interface generates a RAU transport signal including the multiplexed transport data and transmits the RAU transport signal over a respective communication link coupled to that transport media interface for reception by one or more local master units.

Method 1200 further comprises receiving, at each local master unit, one or more RAU transport signals from one or more remote antenna units (block 1208), generating, at each local master unit, one or more L-MU transport signals from the various RAU transport signals received from the remote antenna units (block 1210), and transmitting the one or more L-MU transport signals to one or more remote master units (block 1212). For example, RAU transport media interfaces included in each local master unit can receive the RAU transport signals. A local switch function in each local master unit can, for each received RAU transport signal, demultiplex (separate out) the multiplexed uplink transport data intended for the various base stations. The switch function can also, for each of the various intended base stations, sum the corresponding uplink digital samples included in the transport data received from the various remote antenna units. The switch function can, for each R-MU transport media interface coupled to a remote master unit, multiplex (combine) the summed uplink transport data for the base stations associated with that remote master unit and provide the multiplexed transport data to the R-MU transport media interface used for communicating with that remote master unit. The R-MU transport media interface generates a L-MU transport signal that includes the multiplexed transport data. The L-MU transport media interface transmits the L-MU transport signal over a respective communication link coupled to that L-MU transport media interface. The L-MU transport signals can be communicated as optical signals. Each optical L-MU transport signal can be communicated over a point-to-point optical fiber from a local master unit to a remote master unit. In one such example, each such point-to-point optical fiber is used for communicating only a single optical signal in one direction. In another example, each such point-to-point optical fiber is used for communicating two optical signals, for one in each direction. In such an example, wave-division multiplexors can be coupled to the optical fiber for wave-division multiplexing the two signals. In yet another embodiment, a wavelength selective switch is used as shown above in connection with FIGS. 7-8.

Method 1200 further comprises receiving, at each remote master unit, one or more L-MU transport signals from one or more local master units (block 1214), generating, at each remote master unit, one or more base station signals from one or more L-MU transport signals received from one or more local master units (block 1216), and providing one or more base station signals to one or more base stations coupled to each remote master unit (block 1218). For example, the transport media interfaces included in each remote master unit can receive the L-MU transport signals. A local switch function in each remote master unit can, for each received L-MU transport signal, demultiplex (separate out) the multiplexed uplink transport data intended for the various base stations. The switch function can also, for each of the various intended base stations, sum the corresponding uplink digital samples included in the transport data received from the various remote master units and provide the resulting summed transport data to the appropriate ADC/DAC interface or baseband interface for the intended base station. Each of the ADC/DAC interfaces converts the corresponding summed uplink transport data into an appropriate analog uplink radio frequency signal, which is communicated to the corresponding base station. Each baseband interface converts the corresponding summed uplink transport data into digital baseband data formatted according to a standard base-station baseband protocol, which is communicated to the corresponding base station.

Example Embodiments

Example 1 is a configurable wide area distributed antenna system that includes at least one remote master unit, at least one local master unit, at least one communication link. At least one remote transport media interface and at least one remote transport media interface. The at least one remote master unit is in communication with at least one base station. The at least one remote master unit includes a remote switch function that provides at least one of multiplexing in a downlink direction, demultiplexing in an uplink direction and routing of digital samples. The least one local master unit is located remote from the at least one remote master unit. The at least one local master unit is in communication with at least one remote antenna unit used to provide communication coverage in a select coverage area. The at least one local master unit includes a local switch function providing at least one of demultiplexing in a downlink direction, multiplexing in an uplink direction and routing of digital samples. The at least one remote transport media interface is configured to interface signals between the remote switch function of the at least one remote master unit and the at least one communication link. The at least one local transport media interface is configured to interface signals between the local switch function of the local master unit and the at least one communication link.

Example 2 includes the configurable wide area distributed antenna system of Example 1, further including at least one remote wavelength division multiplexer and at least one local wavelength division multiplexer. The at least one remote wavelength division multiplexer is configured to multiplex optical signals in a downlink direction from at least one associated remote transport media interface to the at least one communication link and demultiplex combined optical signals in an uplink direction from the at least one communication link to the at least one associated remote transport media interface. The at least one local wavelength division multiplexer is configured to multiplex optical signals in an uplink direction from at least one associated local transport media interface to the at least one communication link and demultiplex combined optical signals in the downlink direction from the at least one communication link to the at least one associated local transport media interface.

Example 3 includes the configurable wide area distributed antenna system of any of the Examples 1-2, further including a wavelength selective switch configured to dynamically route signals based on wavelengths between the at least one remote wavelength division multiplexer and the at least one local wavelength division multiplexer through the at least one communication link.

Example 4 includes the configurable wide area distributed antenna system of any of the Examples 1-3, further including at least one controller configured to control communications through the wide area distributed antenna system.

Example 5 includes the configurable wide area distributed antenna system of Example 4, wherein the at least one controller is a master controller.

Example 6 includes the configurable wide area distributed antenna system of Example 4, further including wherein the at least one controller is at least one of a remote master unit controller, a local master unit controller and a selective switch controller.

Example 7 includes the configurable wide area distributed antenna system of any of the Examples 4-6, further including a memory to store operating instructions implemented by the at least one controller.

Example 8 includes the configurable wide area distributed antenna system of any of the Examples 3-7, further including a reference clock signal generator configured to generate a reference clock signal used by the at least one remote master unit, the at least one local master units and the wavelength selective switch to synchronize communications throughout the wide area distributed antenna system.

Example 9 includes the configurable wide area distributed antenna system of Example 8, further wherein the reference clock signal generator is from one of the at least one remote master unit and the at least one local master unit.

Example 10 is a configurable wide area distributed antenna system that includes at a plurality of remote master units, a plurality of local master units, at least one communication link, a remote wavelength division multiplexer for each remote master unit, a local wavelength division multiplexer for each local master unit and a wavelength selective switch. Each remote master unit is in communication with at least one associated base station. Each remote master unit including a remote switch function and at least one remote transport media interface. Each local master unit is positioned in a location that is remote to each of the plurality of the remote master units. Each local master unit is in communication with at least one remote antenna unit that used to provide communication coverage in a select coverage area. Each local master unit includes a local switch function and at least one local transport media interface. The at least one communication link couples transport signals between the plurality of remote master unit and the plurality local master unit. Each wavelength division multiplexer is configured and arranged to multiplex signals into the transport signals in a downlink direction from the at least one remote transport interface of an associated remote master unit and the at least one communication link and demultiplex transport signals in an uplink direction from the at least one communication link to the at least one remote transport interface of the remote master unit. Each local wavelength division multiplexer is configured and arranged to demultiplex the transport signals in the downlink direction from the at least one communication link to the local transport media interface of the at least one local master unit and multiplex signals into the transport signals in the uplink direction from the at least one local transport media interface of the at least one local master unit to the at least one communication link. The wavelength selective switch is configured and arranged to selectively route the transport signals through the at least one communication link.

Example 11 includes the configurable wide area distributed antenna system of Example 10, further wherein the remote switching function is configured to at least multiplexing in a downlink direction, demultiplexing in a uplink direction and routing digital samples and the local switching function is configured to at least demultiplexing in a downlink direction, multiplexing in a uplink direction and routing digital samples.

Example 12 includes the configurable wide area distributed antenna system of any of the Examples 10-11, further including at least one controller configured to control communications through the wide area distributed antenna system.

Example 13 includes the configurable wide area distributed antenna system of any of the Examples 10-12, further including a reference clock signal generator configured to generate a reference clock signal used by the each remote master unit, each local master unit and the wavelength selective switch to synchronize communications throughout the wide area distribution antenna system.

Example 14 is method of operating a distributed antenna system. The method includes communicating base station signals between at least one base station and an associated remote master unit. The associated remote master unit is located at a first location. The method further includes communicating remote antenna unit transport signals between at least one remote unit used for communication coverage at a select communication coverage area and an associated local master unit. The associated local master unit is located at a second different location than the first location of the associated remote master unit. At least one communication link is used to communicate master unit transport signals between at least one remote master unit that includes the associated remote master unit and at least one local master unit that includes the associated local master unit.

Example 15 includes the method of Example 14 further including in a downlink direction, processing downlink base station signals at the associated remote master unit to generate downlink optical master unit transport signals; communicating the downlink optical master unit transport signals to the associated local master unit via the at least one communication link; and processing the downlink optical master unit transport signals at the associated local master unit to generate downlink remote unit transport signals. In an uplink direction, processing uplink remote unit signals of the remote unit signals at the associated local master unit to generate uplink optical master unit transport signals; communicating the uplink optical master unit transport signals to the associated remote master unit via the at least one communication link; and processing the uplink optical master unit transport signals at the associated remote master unit to generate uplink base station signals.

Example 16 includes the methods of any of the Examples 14-15, further including assigning wavelengths to the downlink optical master unit transport signals and the uplink master unit optical transport signals to indicate signal routing information.

Example 17 includes the methods of any of the Examples 14-16, further including using at least one wavelength selective switch to dynamically route the downlink optical master unit transport signals and the uplink optical master unit transport signals between the at least one remote master unit and the at least one local master unit.

Example 18 includes the methods of any of the Examples 14-17, further including in the downlink direction, multiplexing the downlink optical master unit transport signals into combined downlink optical master unit transport signals; and demultiplexing received combined downlink optical master unit transport signals at least one local master unit. In the uplink direction, multiplexing the uplink optical master unit transport signals into combine uplink optical master unit transport signals; and demultiplexing received combined uplink optical master unit transport signals at least one remote master unit.

Example 19 includes the methods of any of the Examples 14-18, further including controlling communication operations of the distributed antenna system with at least one controller.

Example 20 includes the methods of any of the Examples 14-17, further including synchronizing communications of the distributed antenna system with a reference clock signal that is passed at least between remote master units that include the associated remote master unit and local master units that in the associated local master unit.

Example 21 includes a method of operating a distributed antenna system having a plurality of remote master units and a plurality of local master units with each remote master unit at a different location and each local master unit located at a different location while being a spaced distance from the location of each remote master unit. Each local master unit of the distributed antennas system is associated with a different communication coverage area. The method includes in a downlink direction; processing downlink base signals at associated remote master units into downlink multiplexed remote digital samples. The downlink multiplexed remote digital samples are interfaced to create downlink optical master unit transport signals having assigned wavelengths that indicate signal routing information. The downlink optical master unit transport signals are routed to select local master units with a wavelength selective switch over at least one communication link. Received downlink optical master unit transport signals are processed at the select local master units to generate downlink remote antenna unit transport signals. The downlink remote antenna unit transport signals are communicated to at least one associated remote unit. Associated downlink analog radio frequency signals are broadcast from at least one antenna that is in communication with the at least one associated remote unit. In an uplink direction, the method processes uplink remote antenna unit transport signals at associated local master units to generate uplink multiplexed digital samples. The uplink multiplexed local digital samples are interfaced to create uplink optical master unit transport signals having the assigned wavelengths that indicate signal routing information. The uplink optical master unit transport signals are routed to select remote master units with the wavelength selective switch over the at least one communication link. Received uplink optical master unit transport signals are processed at the select remote master units to generate uplink base signals. The uplink base signals are communicated to associated base stations.

Example 22 includes the methods of Example 21, further including controlling communication operations of the plurality of remote master units, the plurality of local master units and the wavelength selective switch with at least one controller.

Example 23 includes the methods of Example 22, wherein the at least one controller is at least one of a remote master unit controller, a local master unit controller, a wavelength switch controller and a standalone controller.

Example 24 includes the methods of any of the Examples 21-23, further including synchronizing the operation of the plurality of remote master units, the plurality of local master units and the wavelength selective switch with a reference clock signal.

Example 25 includes the methods of Example 24, further including conveying the reference clock signal through the downlink optical master unit transport signals and the uplink optical master unit transport signals using a select wavelength.

Example 26 includes the methods of Example 25, further including generating the reference clock signal with one of the plurality of remote master units, the plurality of local master units, the wavelength selective switch and a reference signal generator.

Example 27 includes the methods of any of the Examples 21-26, further including dynamically routing the downlink and uplink optical master unit transport signals with the wavelength selective switch.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A configurable wide area distributed antenna system comprising:
   at least one remote master unit in communication with at least one base station, the at least one remote master unit including a remote switch function that provides at least one of multiplexing in a downlink direction, demultiplexing in an uplink direction and routing digital samples;
   at least one local master unit located remote from the at least one remote master unit, the at least one local master unit in communication with at least one remote antenna unit used to provide communication coverage in a select coverage area, the at least one local master unit including a local switch function that provides routing of digital samples to and from the at least one remote antenna unit and at least one of demultiplexing in a downlink direction and multiplexing in an uplink direction, the local switch function further configured to sum corresponding uplink digital samples intended for a specific base station of the at least one base station;
   at least one communication link;
   at least one remote transport media interface configured to interface signals between the remote switch function of the at least one remote master unit and the at least one communication link;
   at least one local transport media interface configured to interface signals between the local switch function of the local master unit and the at least one communication link; and
   a wavelength selective switch configured to dynamically route downlink optical transport signals and uplink optical transport signals based on wavelengths between the at least one remote master unit and the at least one local master unit, the downlink optical transport signals and the uplink optical transport signals including a reference clock signal of a select wavelength that is used by the at least one remote master unit, the at least one local master unit and the wavelength selective switch to synchronize communications throughout the wide area distributed antenna system.

2. The configurable wide area distributed antenna system of claim 1, further comprising:
at least one remote wavelength division multiplexer configured to multiplex optical signals in the downlink direction from at least one associated remote transport media interface to the at least one communication link and demultiplex combined optical signals in the uplink direction from the at least one communication link to the at least one associated remote transport media interface; and
at least one local wavelength division multiplexer configured to multiplex optical signals in the uplink direction from at least one associated local transport media interface to the at least one communication link and demultiplex combined optical signals in the downlink direction from the at least one communication link to the at least one associated local transport media interface.

3. The configurable wide area distributed antenna system of claim 1, further comprising:
at least one controller configured to control communications through the wide area distributed antenna system.

4. The configurable wide area distributed antenna system of claim 3, wherein the at least one controller is a master controller.

5. The configurable wide area distributed antenna system of claim 3, wherein the at least one controller is at least one of a remote master unit controller, a local master unit controller and a selective switch controller.

6. The configurable wide area distributed antenna system of claim 3, further comprising:
a memory to store operating instructions implemented by the at least one controller.

7. The configurable wide area distributed antenna system of claim 1, further comprising:
a reference clock signal generator configured to generate the reference clock signal used at least by the at least one remote master unit, the at least one local master unit and the wavelength selective switch to synchronize communications throughout the wide area distributed antenna system.

8. The configurable wide area distributed antenna system of claim 7, wherein the reference clock signal generator is from one of the at least one master unit and the at least one local master unit.

9. A configurable wide area distributed antenna system comprising:
a plurality of remote master units, each remote master unit in communication with at least one associated base station, each remote master unit including a remote switch function and at least one remote transport media interface;
a plurality of local master units, each local master unit is positioned in a location that is remote to each of the plurality of the remote master units, each local master unit is in communication with at least one remote antenna unit via digital samples, the at least one remote antenna unit being used to provide communication coverage in a select coverage area, each local master unit including a local switch function and at least one local transport media interface, the local switch function configured to sum corresponding uplink digital samples intended for a specific base station of the at least one base station;
at least one communication link coupling uplink optical transport signals and downlink optical transport signals between the plurality of remote master units and the plurality local master units;
a remote wavelength division multiplexer for each remote master unit, each wavelength division multiplexer configured and arranged to multiplex signals into the downlink optical transport signals in a downlink direction from the at least one remote transport interface of an associated remote master unit and the at least one communication link and demultiplex the uplink optical transport signals in an uplink direction from the at least one communication link to the at least one remote transport interface of the remote master unit;
at local wavelength division multiplexer for each local master unit, each local wavelength division multiplexer configured and arranged to demultiplex the downlink optical transport signals in the downlink direction from the at least one communication link to the local transport media interface of the at least one local master unit and multiplex signals into the uplink optical transport signals in the uplink direction from the at least one local transport media interface of the at least one local master unit to the at least one communication link; and
a wavelength selective switch configured and arranged to selectively route the downlink optical transport signals and uplink optical transport signals through the at least one communication link, wherein the downlink optical transport signals and uplink optical transport signals include a reference clock signal of a select wavelength used by each remote master unit, each local master unit and the wavelength selective switch to synchronize communications throughout the wide area distribution antenna system.

10. The configurable wide area distributed antenna system of claim 9, further wherein:
the remote switching function configured to at least multiplex in the downlink direction, demultiplex in the uplink direction and route digital samples; and
the local switching function configured to at least demultiplex in a downlink direction, multiplex in an uplink direction and route digital samples.

11. The configurable wide area distributed antenna system of claim 9, further comprising:
at least one controller configured to control communications through the wide area distributed antenna system.

12. The configurable wide area distributed antenna system of claim 9, further comprising:
a reference clock signal generator configured to generate the reference clock signal used by each remote master unit, each local master unit and the wavelength selective switch to synchronize communications throughout the wide area distribution antenna system.

13. A method of operating a distributed antenna system, the method comprising:
communicating base station signals between at least one base station and an associated remote master unit, the associated remote master unit located at a first location;
communicating digital remote antenna unit transport signals between at least one remote antenna unit used for communication coverage at a select communication coverage area and an associated local master unit, the associated local master unit located at a second different location than the first location of the associated remote master unit;
using at least one communication link to communicate downlink optical master unit transport signals and uplink optical master unit transport signals between at least one remote master unit that includes the associated remote master unit and at least one local master unit that includes the associated local master unit;
summing uplink digital samples in the master unit transport signals to a specific base station of the at least one base station with a local switch function in the associated local master unit;
synchronizing communications of the distributed antenna system with a reference clock signal having a select wavelength that is conveyed through the downlink optical master unit transport signals and the uplink optical master unit transport signals; and
using at least one wavelength selective switch to dynamically route the reference clock signal.

14. The method of claim 13, further comprising:
in a downlink direction:
processing downlink base station signals at the associated remote master unit to generate the downlink optical master unit transport signals of the master unit transport signals;
communicating the downlink optical master unit transport signals to the associated local master unit via the at least one communication link;
processing the downlink optical master unit transport signals at the associated local master unit to generate downlink remote unit transport signals;
in an uplink direction:
processing uplink remote unit signals of the remote antenna unit transport signals at the associated local master unit to generate the uplink optical master unit transport signals of the master unit transport signals;
communicating the uplink optical master unit transport signals to the associated remote master unit via the at least one communication link; and
processing the uplink optical master unit transport signals at the associated remote master unit to generate uplink base station signals.

15. The method of claim 14, further comprising:
assigning wavelengths to the downlink optical master unit transport signals and the uplink master unit optical transport signals to indicate signal routing information.

16. The method of claim 15, further comprising:
using the at least one wavelength selective switch to dynamically route the downlink optical master unit transport signals and the uplink optical master unit transport signals between the at least one remote master unit and the at least one local master unit.

17. The method of claim 16, further comprising:
in the downlink direction:
multiplexing the downlink optical master unit transport signals into combined downlink optical master unit transport signals;
demultiplexing received combined downlink optical master unit transport signals at least one local master unit;
in the uplink direction:
multiplexing the uplink optical master unit transport signals into combined uplink optical master unit transport signals; and
demultiplexing received combined uplink optical master unit transport signals at least one remote master unit.

18. The method of claim 13, further comprising:
controlling communication operations of the distributed antenna system with at least one controller.

19. A method of operating a distributed antenna system having a plurality of remote master units and a plurality of local master units with each remote master unit at a different location and each local master unit located at different location while being a spaced distance from the location of each remote master unit, each local master unit of the distributed antennas system is associated with a different communication coverage area, the method comprising:
in a downlink direction:
processing downlink base signals at associated remote master units into downlink multiplexed remote digital samples;
interfacing the downlink multiplexed remote digital samples to create downlink optical master unit transport signals having assigned wavelengths that indicate signal routing information;
routing the downlink optical master unit transport signals to select local master units with a wavelength selective switch over at least one communication link;
processing received downlink optical master unit transport signals at the select local master units to generate downlink remote antenna unit transport signals;
communicating the downlink remote antenna unit transport signals to at least one associated remote antenna unit, wherein the downlink remote antenna unit transport signals are digital signals;
broadcasting associated downlink analog radio frequency signals from at least one antenna that is in communication with the at least one associated remote antenna unit;
in an uplink direction:
processing uplink digital remote antenna unit transport signals at associated local master units to generate uplink multiplexed digital samples;
summing the uplink digital samples intended for a specific base station at the associated local master units;
interfacing the uplink multiplexed local digital samples to create uplink optical master unit transport signals having the assigned wavelengths that indicate signal routing information;
routing the uplink optical master unit transport signals to select remote master units with the wavelength selective switch over the at least one communication link;
processing received uplink optical master unit transport signals at the select remote master units to generate uplink base signals;
communicating the uplink base signals to associated base stations;
synchronizing the operation of the plurality of remote master units, the plurality of local master units and the wavelength selective switch with a reference clock signal; and
conveying the reference clock signal through the downlink optical master unit transport signals and the uplink optical master unit transport signals using a select wavelength.

20. The method of claim 19, further comprising:
controlling communication operations of the plurality of remote master units, the plurality of local master units and the wavelength selective switch with at least one controller.

21. The method of claim 20, wherein the at least one controller is at least one of a remote master unit controller, a local master unit controller, a wavelength switch controller and a standalone controller.

22. The method of claim 19, further comprising:
generating the reference clock signal with one of the plurality of remote master units, the plurality of local master units, the wavelength selective switch and a reference signal generator.

23. The method of claim 19, further comprising:
dynamically routing the downlink and uplink optical master unit transport signals with the wavelength selective switch.

\* \* \* \* \*